Figure 4:
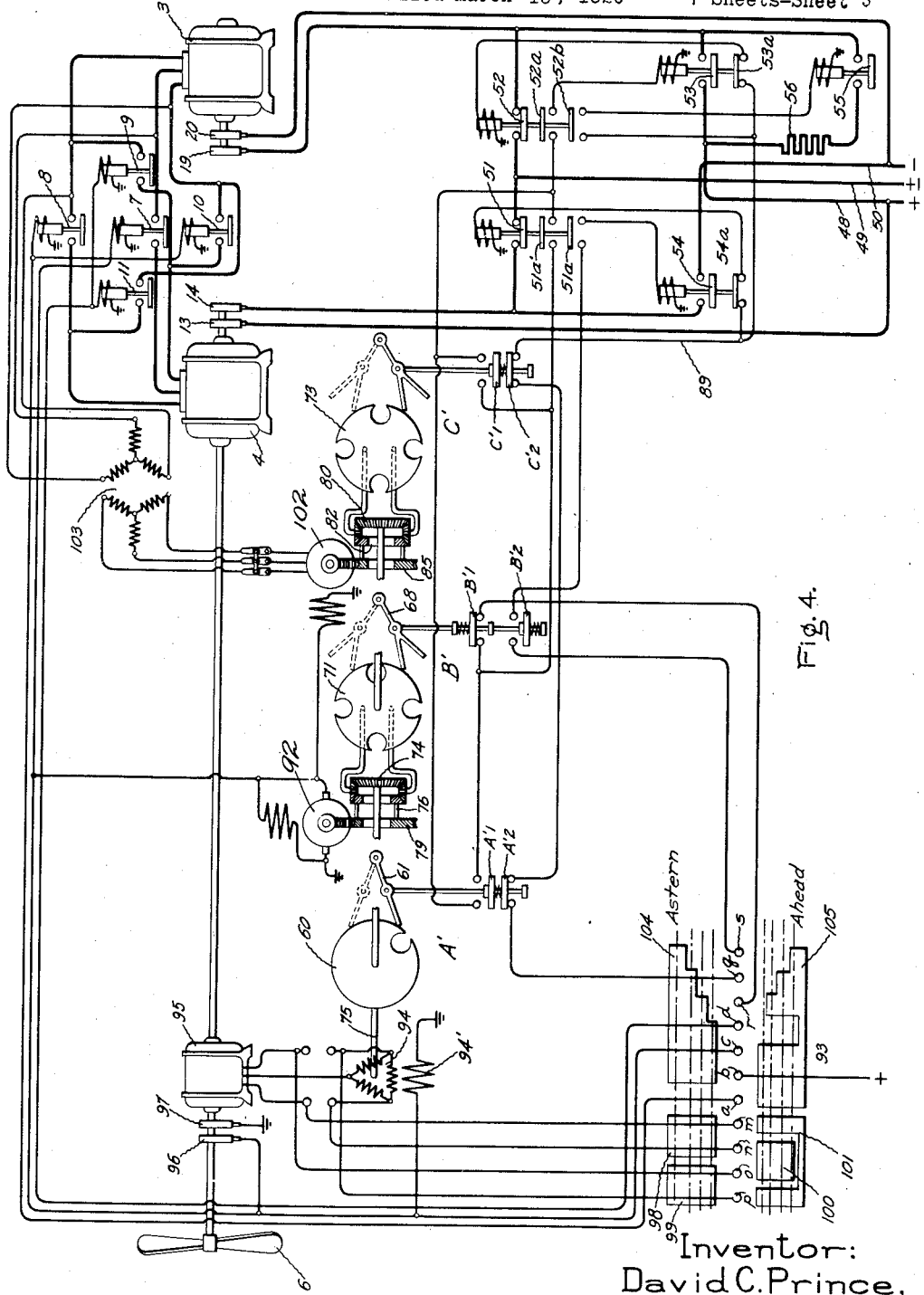

Jan. 29, 1924.
D. C. PRINCE
1,481,881
ELECTRIC SHIP PROPULSION
Filed March 15, 1920    7 Sheets-Sheet 1
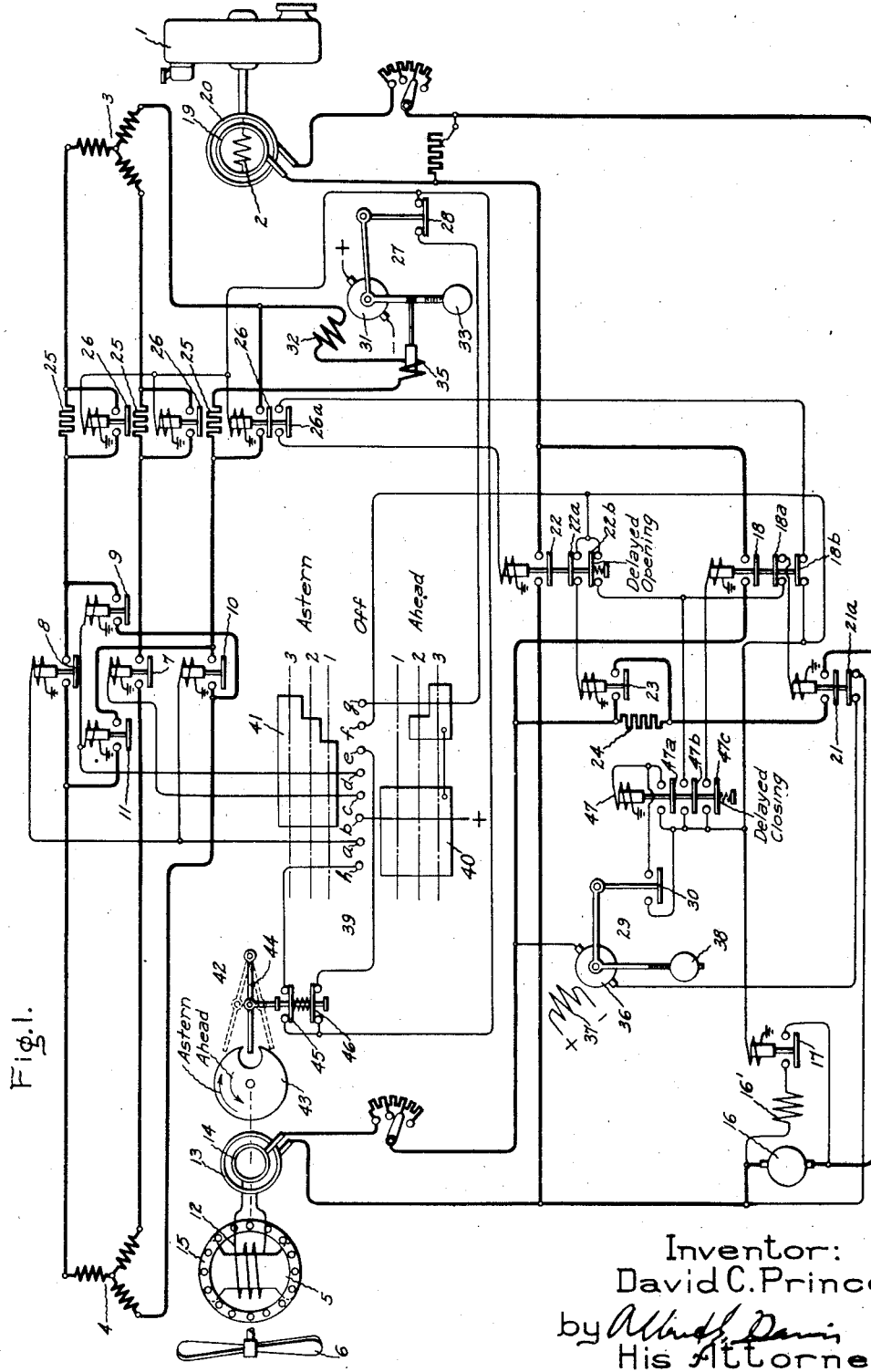
Inventor:
David C. Prince,
by Albert G. Davis
His Attorney.

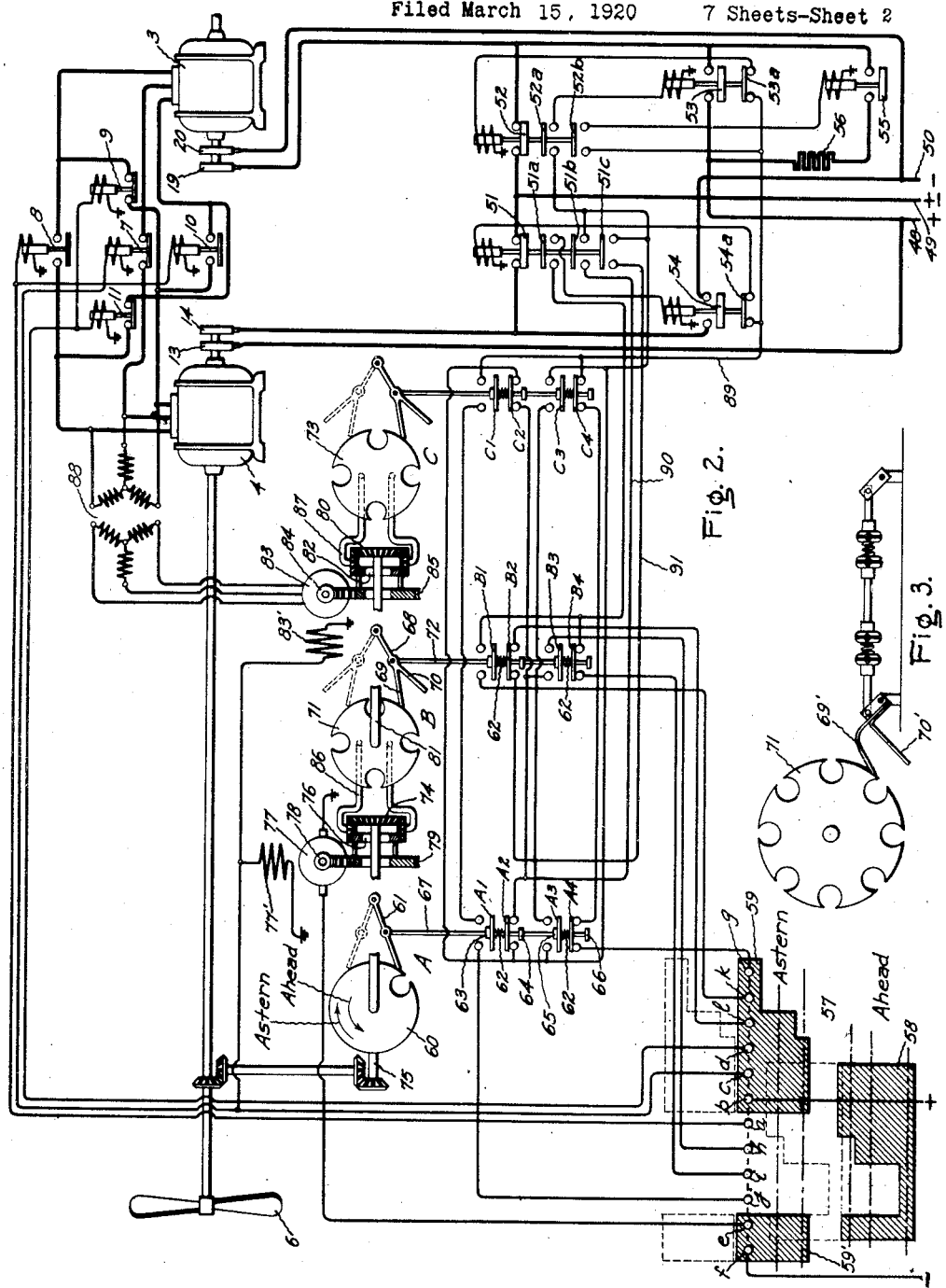

Jan. 29, 1924.  1,481,881

D. C. PRINCE

ELECTRIC SHIP PROPULSION

Filed March 15, 1920  7 Sheets-Sheet 3

Inventor:
David C. Prince,
by [signature]
His Attorney.

Jan. 29, 1924.

D. C. PRINCE 1,481,881

ELECTRIC SHIP PROPULSION

Filed March 15, 1920    7 Sheets-Sheet 4

Inventor:
David C. Prince,
by
His Attorney.

Jan. 29, 1924.

D. C. PRINCE 1,481,881

ELECTRIC SHIP PROPULSION

Filed March 15, 1920     7 Sheets-Sheet 5

Inventor
David C. Prince,
by Albert G. Davis
His Attorney

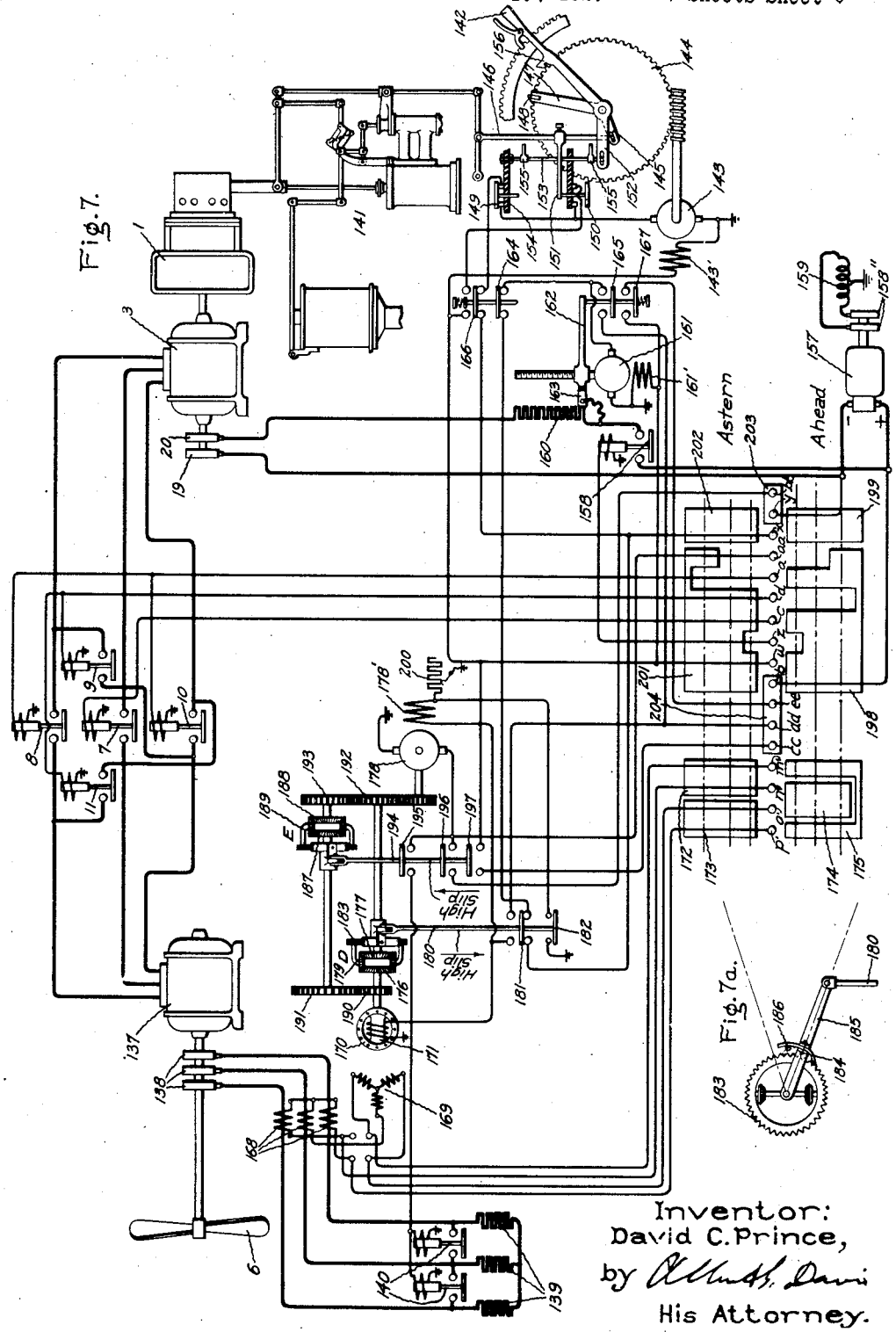

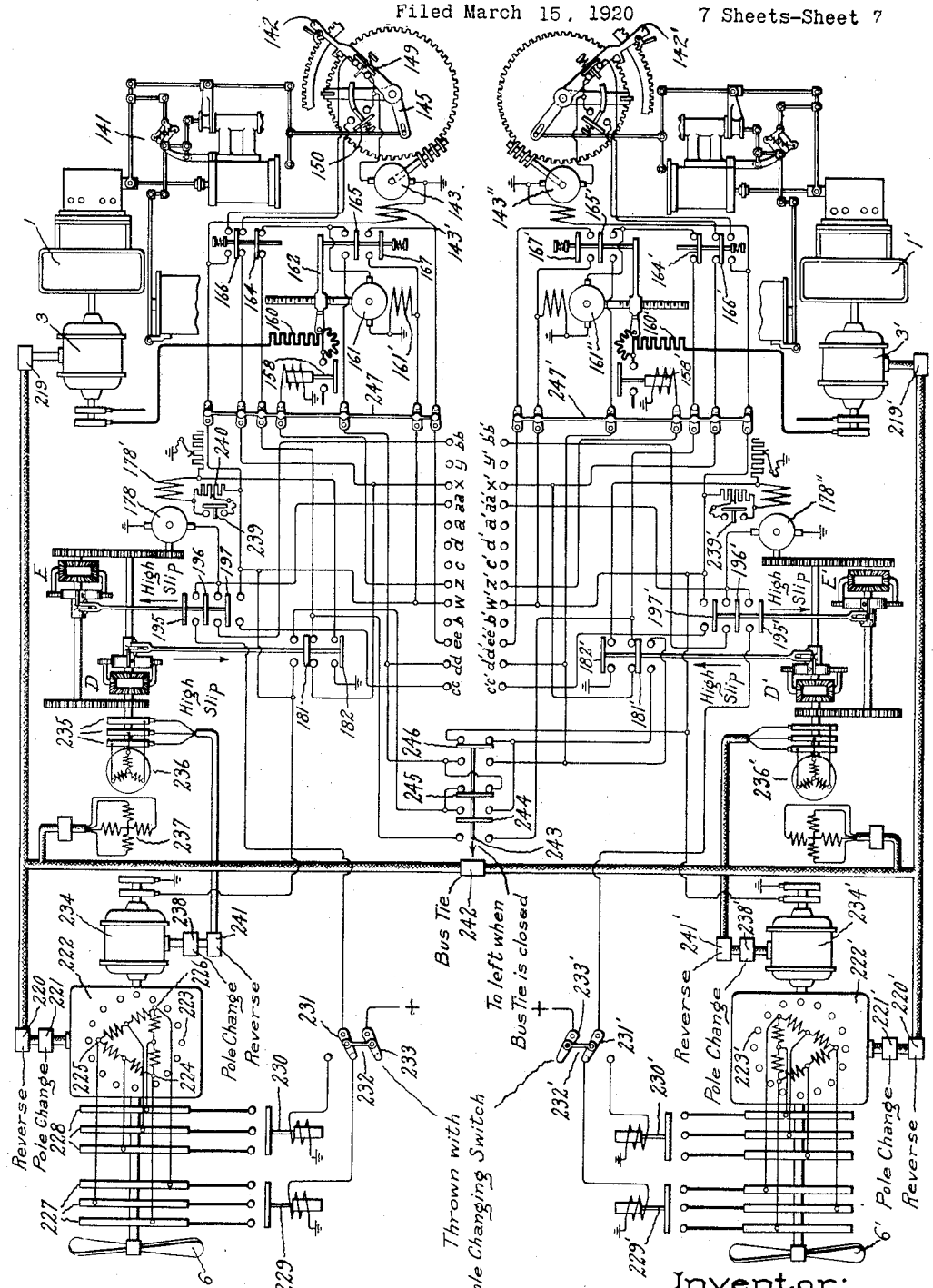

Patented Jan. 29, 1924.

1,481,881

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

ELECTRIC SHIP PROPULSION.

Application filed March 15, 1920. Serial No. 365,762.

*To all whom it may concern:*

Be it known that I, DAVID C. PRINCE, a citizen of the United States, residing at Schenectady, in the county of Schenectady, State of New York, have invented certain new and useful Improvements in Electric Ship Propulsion, of which the following is a specification.

My invention relates to electric propulsion and more particularly to electric ship propulsion wherein one or more alternating current motors are arranged to operate the propeller or propellers, although certain features of my invention are adapted to be used wherever an individual prime mover dynamo plant is arranged to supply alternating current to work motors which are required to be started, stopped, reversed and operated under conditions analogous to those occurring in ship propulsion.

An object of my invention is to provide means for enabling the various control operations necessary for operating and maneuvering an electrically propelled ship to be performed efficiently, with precision, and with certainty of result.

A further object of my invention is to provide means for automatically performing various control operations in an electric ship propulsion system in accordance with the value of the slip of the propeller driving motors.

A further object of my invention is to provide automatically operating control means for an electric ship propulsion system, whereby the stability of operation may be increased and the efficiency of the system maintained at a high value.

A further object of my invention is to provide means for regulating the stability of operation of a synchronous motor in accordance with the mechanical lag of the motor.

Electric ship propulsion systems comprising one or more high speed turbine driven generators arranged to supply current to low speed induction motors directly connected to the ship's propellers are well known, as shown, for example, by Emmet Patent No. 1,214,528, February 6, 1917. It is, however, in many cases desirable to drive the propeller or propellers by motors adapted to operate as synchronous motors, and since such motors are incapable of exerting synchronously, the torque required during maneuvering operations, special provisions are necessary to adapt them to ship propulsion work. One arrangement proposed for enabling the practical application of synchronous motors to ship propulsion work is disclosed in the application of Ernst F. W. Alexanderson, Serial No. 358,973, filed Feb. 16, 1920, assigned to the assignee of this application. This arrangement, which will be described hereinafter so far as may be necessary to an understanding of my invention, discloses the idea of means for operating the synchronous motor as a synchronous generator to exert the torque necessary to break the propeller away from the water when it is desired to stop or reverse the ship, and the idea of means for operating the motor as an induction motor to start or reverse the propeller. It will be observed, therefore, that induction motor operation may occur in the synchronous motor ship as well as in the induction motor ship.

It has been found that practically all of the phenomena observed in connection with the operation of electrically driven ships can be referred to the slip of the propeller driving motor notwithstanding the fact that the primary frequency is varied between wide limits and the primary voltage varied over a considerable range. The maximum torque of the induction motor for given action takes place at a constant number of cycles per second slip, furthermore, any percentage of the maximum torque corresponds to a perfectly definite and constant number of cycles slip, I have, therefore, conceived the idea of basing the control of various operations upon the slip measured in cycles.

It has been found that when starting and reversing the ship, it is desirable to increase the alternator excitation to the maximum possible value. Under these circumstances, the slip is high and the device operating on slip will, therefore, be made to produce the maximum excitation. If the vessel runs into head-winds or other storm conditions, it may be necessary to increase the alternator excitation. The necessity for this increase is accompanied by an increase in the number of cycles slip above normal. The highest efficiency of operation is obtained when the minimum amount of excitation consistent with sufficient torque in the motor, is supplied to the alternator. As long as the slip does not exceed a known constant value in cycles per second the excitation may be reduced. The limit of such reduction is at once indicated by an increase in the number of cycles slip above the predetermined value. If, for example, the ship's rudder is suddenly thrown to one side, an increased load is placed upon the motor and the resulting increase in slip indicates that the excitation should be increased on the generator. Besides an increase in the generator excitation, the motor torque, with relation to the propeller torque, may be increased by a decrease in the speed of the driving means for the generator. This decrease will, when stability has been reached, cause the slip to fall below the predetermined amount. All of the adjustments mentioned may, therefore, be taken care of by a device arranged to operate on a basis of actual number of cycles slip of the motor. It is sometimes desirable, moreover, under certain conditions to change the induction motor characteristics by controlling the amount of resistance in the secondary or by operating contactors which control low resistance windings thus varying the equivalent resistance of the secondary. The time for such changes is very accurately determined by the cycles slip of the motor.

According to my invention synchronous speed and actual motor speed are combined through a differential gear or its equivalent, so that a speed of rotation or other effect proportional to the slip is produced. This speed of rotation or other effect is combined with a constant known speed or other effect corresponding to the desired value of slip through a second differential gear or its equivalent. The planet carrier or its equivalent of the second differential gear is arranged to be stationary when the main motor is operating with the predetermined desired slip in cycles per second, and the motion of this carrier is unaffected by changes in the frequency of the currents supplied to the motor. I have arranged my mechanism to respond to departures from a predetermined number of cycles slip, as distinguished from variations in the per cent of slip, for the reason that in a ship propulsion system the frequency varies over such a wide range as to render any device operating in response to changes in the per cent of slip useless for the purpose described.

As heretofore indicated, the same apparatus slightly modified is equally advantageous for the control of a ship propelled by synchronous motors, since during maneuvering operations, the synchronous motors are operated as induction motors, that is, in starting and reversing the synchronous motor functions as an induction motor until it has attained a speed at which it can be synchronized. During these operations all of the phenomena are functions of the slip and can be dealt with by my apparatus.

My invention will be better understood from the following description taken in connection with the accompanying drawings and its scope will be pointed out in the appended claims.

Figure 5:
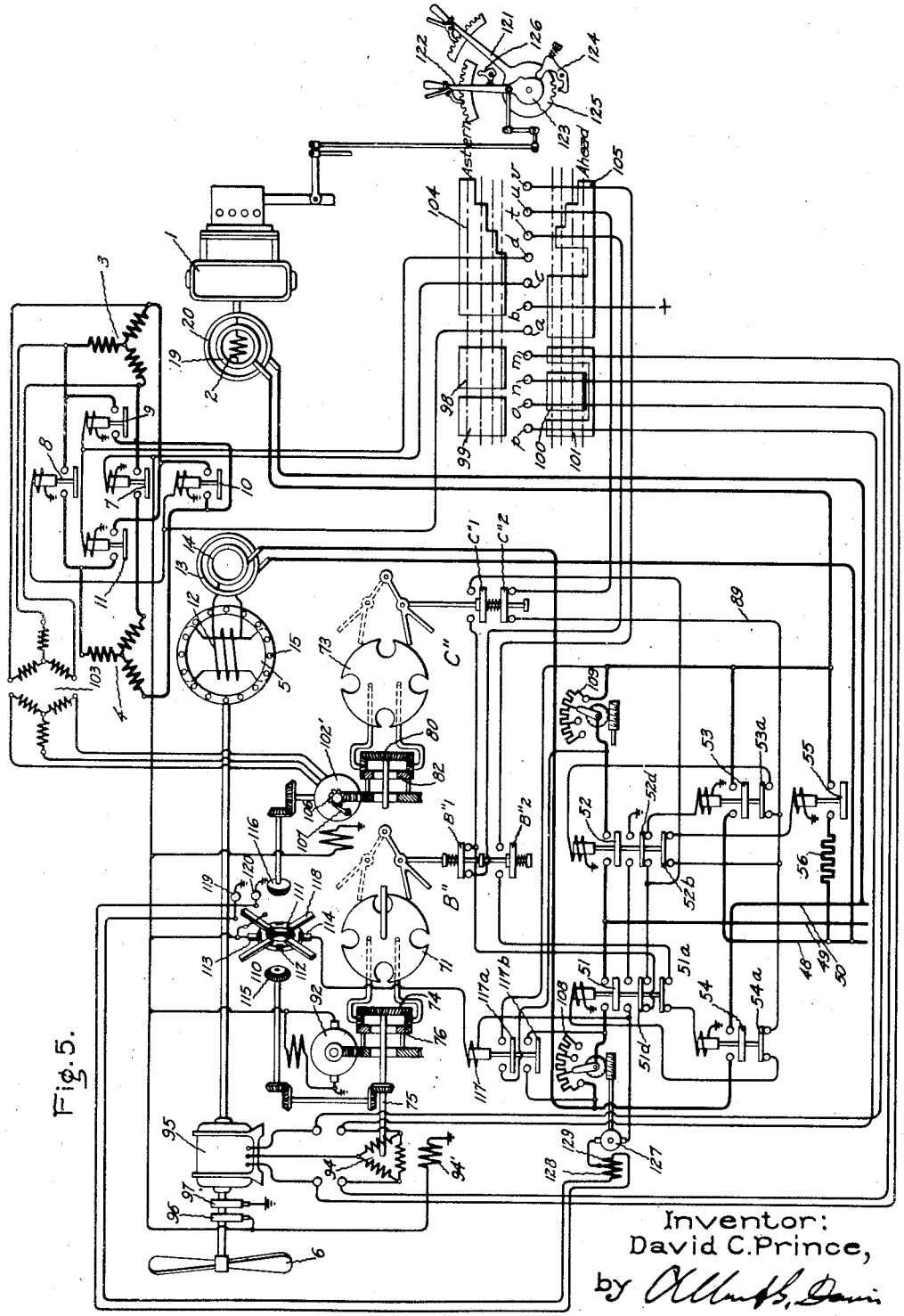
Figure 6:
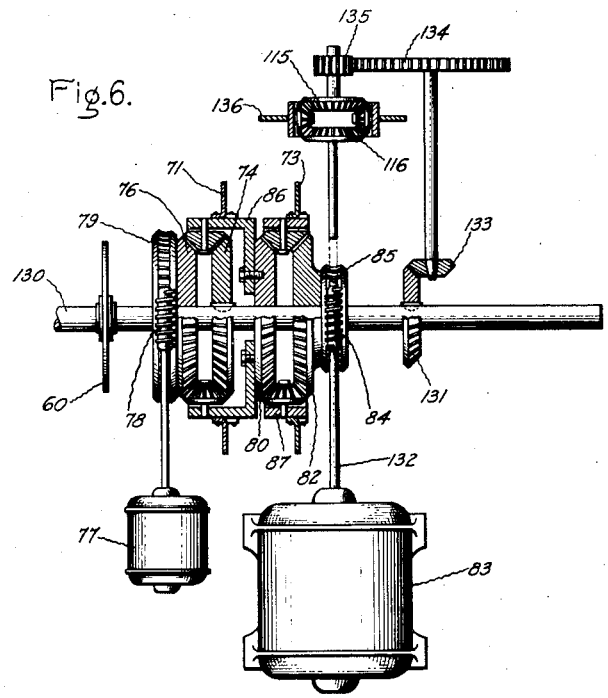
Figure 8:
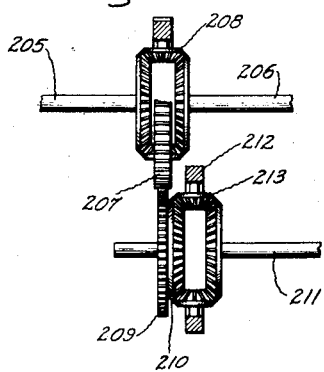
Figure 9:
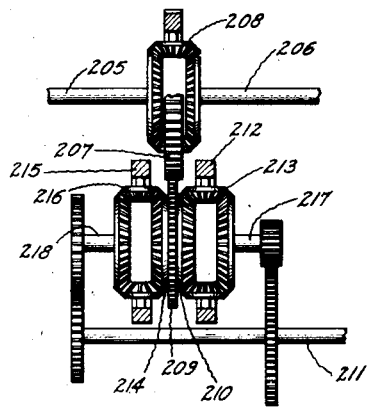
Figure 11:
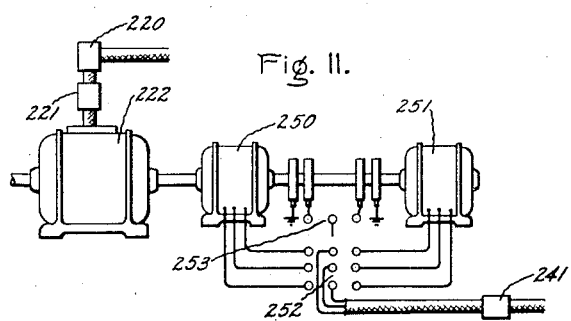

Referring to the accompanying drawings, Fig. 1 is a diagrammatic representation of a ship propulsion system in which the propeller driving motor is arranged to operate as a synchronous generator for braking purposes, as an induction motor for reversing and acceleration and as a synchronous motor for normal operation, and in which means are included for insuring the proper functioning of the system in an entirely automatic manner while maneuvering; Fig. 2 represents a ship propulsion system of the same type including means for controlling the various maneuvering operations in accordance with the actual value of slip of the propeller driving motor; Fig. 3 is a detail view of a disc operated relay used in Fig. 2; Fig. 4 represents a modified arrangement of control means of the type shown in Fig. 2; Fig. 5 represents the preferred arrangement of control means together with means for insuring the stable operation of the propeller driving motor during synchronous operation; Fig. 6 represents a practical embodiment of the differential mechanism diagrammatically indicated in Fig. 5; Fig. 7 is a diagrammatic representation of an induction motor ship propulsion system provided with means for controlling the operation of the system both during maneuvering and during normal operation in accordance with the slip of the propeller driving motor; Fig. 7ª shows a detail of the differential switch operating mechanism of Fig. 7; Figs. 8 and 9 represent modified forms of differential mechanism that may be used; Fig. 10 is a diagrammatic representation of a ship propulsion system comprising a plurality of multiple speed propeller driving motors and a plurality of generators which may be interconnected in various ways, together with means for controlling the operation of the system both during maneuvering and normal operation in accordance with the slip of the propeller driving motors; and Fig. 11 represents a modification of one of the elements comprised in the combination shown in Fig. 10.

Referring to Fig. 1, an elastic fluid turbine 1 is arranged to drive directly the revolving field member 2 of a synchronous generator whose stator 3 is adapted to be connected to the stator 4 of a propeller driving motor whose rotor 5 is directly connected to the propeller 6. Circuit controlling and reversing contactors 7, 8, 9, 10 and 11 are provided in the connections between the stator windings 3 and 4. With contactors 7, 8, and 10 closed, the phase rotation is such that the propeller is driven in one direction, and with contactors 7, 9 and 11 closed, the phase rotation is reversed to reverse the direction of propeller rotation. The propeller motor rotor is represented as a bipolar salient pole revolving field structure provided with an exciting winding 12 connected to slip rings 13 and 14. It will be understood, however, that the motor will in general have from 60 to 80 poles. The rotor is provided with a squirrel cage winding 15 to provide effective induction motor torque during maneuvering operations as hereinafter set forth. An exciter 16, provided with field winding 16'; is arranged to be connected to excite the generator and motor field windings 2 and 12 either independently or in series as hereinafter described. A switch 17 is arranged to control the circuit of the exciter field winding 16'. Switches 18, 21, 22 and 23 are arranged to control the excitation circuits for the generator and motor field windings. When switch 18 is closed, these field windings are connected in series, the circuit leading from one terminal of exciter 16 to slip ring 13, through motor field winding 12, to slip ring 14, through switch 18 to slip ring 19, through the generator field winding 2 to slip ring 20 and thence to the other terminal of exciter 16. When the switch 18 is open and the switch 21 closed, the exciter 16 is connected directly to slip rings 13 and 14 to apply the full voltage of the exciter to the motor field winding. When the switch 22 alone is closed, the full voltage of the exciter 16 is applied to the generator field winding 2. A switch 23 is arranged to short-circuit a resistor 24 in the circuit closed by switch 21 for a purpose hereinafter set forth. Resistors 25 are provided in the mains connecting stator windings 3 and 4 for a purpose hereinafter described, and switches 26 are arranged to short-circuit these resistors. Normally, the motor operates as a synchronous motor and the winding 3 is directly connected to the winding 4 for a certain direction of operation depending upon whether the switches 7, 8 and 9 or 7, 9 and 11 are closed, the resistors 25 being short-circuited by the switches 26. During this synchronous operation switch 18 is held closed, the exciter 16 being thus connected to supply the motor and generator field windings 12 and 2 in series. When it is desired to stop or reverse the ship, the switch 18 is opened and the switches 21 and 23 closed thus applying the full exciter voltage and capacity to the motor field winding, the generator field winding being left unexcited. The line contactors 7 to 10 are operated so that the phase rotation between the stator windings 3 and 4 is reversed and the switches 26 are opened. As thus arranged, the inertia of the ship dragging the propeller 6 through the water causes the motor to operate as a synchronous generator to break the propeller from the water and bring it to a standstill. The braking energy developed in the motor is dissipated largely in the solid field cores of the generator rotating field element by the eddy currents therein developed. In addition to this energy dissipation, energy is dissipated in the generator and motor windings. It is apparent that as the propeller slows down, due to the braking action, the frequency of the currents circulating between the stator windings 4 and 3 will fall, and that the frequency of these currents is, therefore, a measure of the speed of rotation of the motor. A relay 27 is arranged, in a manner hereinafter described, to close a contact 28 when the frequency of the braking currents is reduced to a predetermined low value. The contact 28, in a manner hereinafter described, causes the switch 22 to close to throw the full voltage of the exciter 16 on the generator field winding 2, and causes switch 21 to open to deenergize the motor field winding 12. The contact 28 is also arranged to close the switches 26 and short-circuit the resistors 25. It is apparent that with this arrangement of connections the generator will be overexcited and the motor unexcited, and that the motor will, therefore, operate as an induction motor to give a strong reversing torque to reverse the propeller and accelerate it in the opposite direction. While the propeller motor is thus operating as an induction motor an alternating electromotive force having the frequency of slip will be induced in the motor field winding 12 as is obvious to those skilled in the art. When the slip has reached a predetermined low value, a relay 29 is arranged, in a manner hereinafter described, to close a contact 30 to reestablish the circuit of motor field winding 12. The motor is thus brought into exact synchronism with the generator, after which the motor and generator field windings are connected to be excited in series for normal synchronous operation in the reversed direction. A system involving the cycle of operations just set forth is described and claimed in the copending application of Ernst F. W. Alexanderson, Serial No. 358,973, filed February 16, 1920, heretofore referred to. The operation of the system has been thus briefly stated in order to enable the complete construction and operation to be set forth more clearly and simply.

Relay 27 is provided with a winding 31 in the form of a small direct current motor armature, and this winding is supplied from any convenient source of direct current. The relay field winding 32 is arranged to be connected in one of the mains connecting the generator and motor stator windings 3 and 4. The relay is provided with a pendulum comprising an adjustable weight 33 which tends to maintain the contact 28 in closed position. The relay is adjusted to have a natural period of one second. A winding 35 connected in series with coil 32 is arranged so as to tend to hold the contact 28 open. Relay 27 will, therefore, remain closed on a dead circuit and open on high frequencies, but will close its contact 28 intermittently on frequencies of about one cycle. Relay 29, on the other hand, is arranged normally to hold its contact 30 open. Winding 36 of relay 29 is connected across the terminals of motor field winding 12 through slip rings 13 and 14. A contact 21$^a$ interlocked with contact 21 is provided in the circuit of winding 36 for a purpose hereinafter described. Field winding 37 of relay 29 is arranged to be connected to any suitable direct current source. Relay 29 is provided with an adjustable weight 38 tending to hold contact 30 in open position as above set forth. This relay is adjusted to have a natural period of one-third second, that is, the pendulum makes three double swings per second. The relay remains open on a dead circuit and closes intermittently for frequencies of three cycles, but is arranged to remain open when direct current passes through the winding 36, which happens whenever the motor field winding is excited and the contact 21 closed.

A controller 39 having ahead and astern segments 40 and 41 is arranged to control the various line contactors and excitation switches as hereinafter set forth, and a direction relay 42 is arranged to cooperate with the controller in a manner to secure the proper functioning of the system during maneuvering operations. All maneuvering operations may be performed by a mere manipulation of the controller to accomplish the desired maneuver and no skill or care on the part of the operator is necessary to insure that the operations of synchronous braking, induction motor action and synchronizing take place when necessary, and only when necessary, and at the proper time. The direction relay comprises a disc 43 mounted on the propeller shaft arranged to operate the pivoted lever 44 in one direction or the other according to its direction of rotation. The lever 44 is arranged to operate contacts 45 and 46. As shown in the drawing, the disc 43 is arranged to rotate counter-clockwise when the propeller is running forwards and to rotate clockwise when the propeller is running backwards. Forward rotation closes contact 45, while backward rotation closes contact 46. The controller segments 40 and 41 cooperate with contact fingers $a, b, c, d, e, f, g, h$.

The operation of the system shown in Fig. 1 is as follows: Assuming that the ship is operating in the head direction, controller segment 40 will be in engagement with the controller contact fingers to maintain line contactors 7, 8, 10 and 26 closed, and to maintain excitation switch 18 closed. The exciter 16 will supply current to the field winding 12 of the motor and field winding 2 of the generator in series as heretofore described. Assume now that the operator desires to reverse the ship. He will merely throw the controller 39 from its full ahead to its full astern position. As the controller goes through off position all of the control circuits will be deenergized and all excitation switches and line contactors will open. As the controller goes to its final astern position segment 41 will first engage fingers $b$, $c$, $d$ and $e$. Finger $b$ is connected to any convenient source of supply. Fingers $c$ and $d$ will be energized to close contactors 7, 9 and 11 to reverse the phase rotation between generator and motor stator windings. Controller finger $e$ will energize no circuit for the reason that the direction relay now maintains contact 46 open. As the controller goes through position 2, finger $f$ is energized to close switch 17 to render the exciter 16 active. Controller finger $f$ also completes a circuit through interlock contact 22$^b$ of switch 22 and interlock contact 18$^a$ of switch 18 to close switch 21. A circuit is also completed from contact finger $f$ through interlock contact 22$^a$ to close switch 23 and short-circuit resistor 24. The full voltage and capacity of the exciter 16 is, therefore, applied to the motor field winding 12. The motor operates as a synchronous generator to stop the propeller in the manner heretofore set forth. At this time contactors 26 are open and the braking currents are caused to circulate through the resistors 25 which are provided to improve the power factor and increase the braking effect. When the frequency of braking currents has fallen to one cycle per second, relay 27 tends to close contact 28 intermittently, and the first closure completes a circuit from controller finger $g$ (which finger is now energized, the controller having been moved to its third and final position) to the operating coils of contactors 26 which therefore close and short-circuit resistors 25. One of the contactors 26 is also arranged to short-circuit windings 32 and 35 of relay 27 which remains in its closed position. An interlock contact 26$^a$ on contactor 26 now completes a circuit from finger $f$ through interlock contact 18$^b$ to close switch 22. The full voltage of exciter 16 is thus applied to the generator field winding 2 and after an interval sufficient to permit the current in the generator field winding to build up to its full value contact 22$^b$ of switch 22 opens thus interrupting the circuit of the operating coil of switch 21, which, therefore, opens and deenergizes the motor field winding 12. Strong induction motor torque is now exerted to reverse the propeller and bring it up to speed in the astern direction. As reversal takes place, the direction relay 42 opens contact 45 and closes contact 46. The opening of contact 45 has no effect, however, for the reason that controller finger $h$ is deenergized at this time and the closing of contact 46 has no effect for the reason that the circuit completed by this contact is in parallel with the circuit completed by contact 28 of relay 27 which is now closed. The opening of switch 21 closes contact $21^a$ to connect winding 36 of relay 29 across the terminals of motor field winding 12. When the propeller driving motor has reached nearly full speed in the astern direction, relay 29, which begins to operate when the slip reaches a value of three cycles per second, closes contact 30 completing a circuit from controller finger $f$ to coil 47 which is arranged to operate contacts $47^a$, $47^b$ and $47^c$. Contacts $47^a$ and $47^b$ close immediately, the former completing a holding circuit independent of contact 30 for coil 47. Contact $47^b$ completes a circuit through interlock contact $18^a$ to close switch 21. The closure of switch 21 energizes field winding 12 of the motor to bring it into synchronism with the generator. After an interval of time sufficient for the motor field current to be established, contact $47^c$ closes to energize the closing coil of switch 18. At the instant switch 18 closes interlock contact $18^a$ opens switch 21 and interlock $18^b$ opens switch 22. During a small interval of time switches 18, 21 and 22 are closed and the resistor 24 is, therefore, provided for the purposes of preventing a short-circuit on the exciter 16, which circuit would lead from one terminal of the exciter through switches 22, 18 and 21 to the other terminal of the exciter. Normal synchronous operating connections are now established for operation in the astern direction, the field windings 2 and 12 being connected in series through switch 18. The function of contact $21^a$ in the circuit of winding 36 of relay 29 is to prevent the relay 29 from closing the contact 30 at the instant the switch 21 opens to deenergize the motor field winding 12 at the end of the synchronous braking operation. As heretofore set forth, the relay 29 is arranged to hold contact 30 open with a direct electromotive force applied to its terminals. With this arrangement it is evident that upon interrupting the motor field circuit an inductive kick would be produced which would tend to close contact 30. Contact $21^a$ is, therefore, interlocked with switch 21 so that the circuit of winding 36 is completed only while switch 21 is in the open position.

The function and operation of the direction relay 42 will now be described. It will be observed that the first position of the controller on either side of the off position tends to complete a circuit to establish synchronous braking connections. It is apparent that synchronous braking is desired whenever the ship is to be brought quickly to a stop even though it be not desired to move astern. Such quick stopping will be performed by throwing the controller to reverse position and then to off position. If, however, while the ship is drifting in the ahead direction, the operator desires to execute the command full speed ahead, it is evident that the synchronous braking operation is unnecessary and undesirable. The direction relay 42 is provided to eliminate the synchronous braking operation under such conditions. The operation of the system in passing from ahead operation to astern operation has been heretofore set forth. If, while operating in the astern direction, the controller is thrown to off position and left there, the ship will drift astern. If the command full speed astern is now given, the operator will merely throw the controller to full astern position. Controller fingers $c$ and $d$ will close contactors 7, 9 and 11 for astern operation and controller finger $e$ will complete a circuit through contact 46 of direction relay 42, which is now closed, directly to the operating coils of contactors 26. It will be observed that this circuit shunts contact 28 of relay 27 and connections are, therefore, at once established which would not otherwise be established until contact 28 closed. Interlock contact $26^a$ is, therefore, at once closed to close switch 22 for induction motor operation as heretofore set forth, and the operation of synchronous braking is thus eliminated. Controller finger $h$ and contact 45 cooperate to eliminate synchronous braking when it is desired to accelerate in the ahead direction while the ship is drifting ahead. It is believed that the execution of other maneuvering operations will be obvious from the operations described.

In the description heretofore given, no reference has been made to governing and control mechanism for the turbine 1, but it is to be understood that such mechanism is employed. As far as the operation of my invention is concerned, however, any well known form of governing and controlling mechanism may be used, such mechanism being broadly old in the art, as shown, for example, by the patent to Emmet No. 1,137,308, patented April 27, 1915. In order to enable the motor and generator to get into step readily, it is desirable to reduce the speed of the turbine during maneuvering operations, as shown by the patent to Emmet No. 1,214,528, patented February 6, 1917.

In the modification shown in Fig. 1, the exciter has been represented as arranged to supply normal excitation to the generator and motor field windings in series. The modification shown in Fig. 2 shows a three-wire system for exciting the field windings, such a system being well adapted for connecting the generator and motor field windings for either normal or double excitation. The mains of the three-wire system are represented by the lines 48, 49 and 50. A switch 51 is arranged to connect the lines 48 and 49 directly to the slip rings 13, 14 which supply the motor field winding. When switch 51 is closed normal excitation is supplied to the motor. A switch 52 is arranged to connect the lines 49 and 50 to the slip rings 19, 20 which supply the generator field winding. When switch 52 is closed normal excitation is supplied to the generator. A switch 53 is arranged to connect the generator field winding to lines 48 and 50 for overexcitation. A switch 54 is arranged to connect the motor field winding to lines 48 and 50 for overexcitation. A switch 55 is provided for enabling the transition to be made from overexcitation to normal excitation on the generator without short-circuiting one side of the three-wire system. Switch 55 completes a shunt circuit around switch 53 through resistor 56. Switches 51, 52, 53, and 54 are provided with certain interlock contacts, the function of which will be set forth as the description proceeds. A controller 57 provided with main ahead and astern segments 58 and 59 and an auxiliary segment 59' is arranged to cooperate with a row of contact fingers to control the circuit connections as hereinafter set forth. The controller fingers $a$, $b$, $c$, and $d$ cause the operation of the circuit controlling and reversing contactors 7, 8, 9, 10 and 11 exactly as in Fig. 1. The controller segments are shown in their off positions in dotted lines and are crosshatched in the position they occupy when the controller is in the full speed astern position. The various elements of the system are shown in the positions they occupy during operation in the astern direction, line contactors 7, 9 and 11 being closed and switches 51 and 52 being closed to apply normal excitation to the generator and motor field windings.

The modification shown in Fig. 2 differs further from the modification shown in Fig. 1 in that means are provided for governing or controlling the changes in the excitation circuits in accordance with the actual value of slip in the driving motor 4. This mechanism comprises three disc operated relay devices hereinafter referred to as relays A, B and C. Relay A is a direction relay operating to perform the functions set forth in connection with the description of relay 42 of Fig. 1. Relay A comprises a disc 60 positively driven in any suitable manner from the shaft of the propeller 6 upon which the rotor of the driving motor is mounted. A pivoted arm 61 is arranged to operate contacts $A^1$, $A^2$, $A^3$ and $A^4$. Springs 62 are provided between contacts $A^1$, $A^2$ and between contacts $A^3$, $A^4$. Shoulders 63, 64, 65 and 66 are arranged on the operating rod 67 connected to the pivoted lever 61 in such manner that when the disc is rotating clockwise, contacts $A^2$ and $A^4$ will be in closed position and contacts $A^1$ and $A^3$ in open position, and, so that with counterclockwise rotation of the disc, contacts $A^1$ and $A^3$ will be in closed position and contacts $A^2$ and $A^4$ in open position. The arrangement of parts is further such that during reversal of disc 60 all of the contacts will be in engagement for a short interval. Relay B is provided with contacts $B^1$, $B^2$, $B^3$ and $B^4$ mounted in the same manner as contacts $A^1$, $A^2$, $A^3$ and $A^4$. The pivoted arm 68 of relay B differs from the pivoted arm 61 of relay A, however, in that it is provided with two members 69 and 70 for cooperating with disc 71. The construction of relay B is indicated more clearly in Fig. 3, wherein the members 69' and 70' are indicated as made of spring material. These members are spaced apart by such a distance that the passage of two notches of the disc is required to cause a complete operation of the relay contacts. In Fig. 2, for example, counterclockwise rotation of disc 71 will cause the first notch to engage the member 69 to operate the pivoted lever 68 to move the rod 72 and cause contacts $B^1$ and $B^3$ to close. Contacts $B^2$ and $B^4$ still remain closed, however, due to the action of springs 62. The next notch of disc 71 engages member 70 to move rod 72 a further distance sufficient to open contacts $B^2$ and $B^4$. The spacing of the notches in disc 71 and the speed of operation of the disc is such, as will be hereinafter pointed out, that the interval of time during which both sets of contacts remain closed is sufficient to permit the current in the generator field winding to build up to its full value. Relay C, operated by disc 73, is provided with contacts $C^1$, $C^2$, $C^3$ and $C^4$ arranged to be operated in the same manner as the corresponding contacts of relays A and B. The direction of rotation of disc 60 of relay A corresponds to that of propeller 6. The direction and speed of rotation of disc 71 of relay B depends upon the algebraic sum of the speeds of rotation of gear 74 mounted on shaft 75 carrying disc 60, and gear 76 driven from motor 77 through worm 78 and worm wheel 79. The direction and speed of rotation of disc 73 of relay C depends upon the algebraic sum of the speeds of rotation of gear 80 mounted upon shaft 81 carrying disc 71 and gear 82 driven from motor 83 through worm 84 and worm wheel 85. The disc 71 is carried by the planet carrier 86 of the differential mechanism comprising gears 74 and 76 and the disc 73 is carried by the planet carrier 87 of the differential mechanism comprising gears 80 and 82. Motor 77 provided with field winding 77' is a direct current constant speed motor one side of which is grounded to the neutral of the three wire system 48, 49 and 50, and the other side of which is connected to controller finger e. When the controller is in the astern position segment 59' bridges fingers e and f to complete a circuit to drive motor 77 in one direction, and when the controller is in the ahead position, segment 58 bridges controller fingers b and e to complete a circuit to drive motor 77 in the opposite direction. Motor 83 is designed to get into synchronism with the currents supplied thereto and is connected across the terminals of the propeller motor stator winding through transformer 88. The field winding 83' of motor 83, as well as the field winding 77' of motor 77, is energized from controller finger c.

The connections established by the relays A, B and C and the cooperation of these relays with the controller and with the excitation controlling switches may be most readily set forth in connection with a description of the operation of the system. As heretofore stated, the parts are shown in the position they occupy during astern operation. In order to explain clearly the operations of the relays A, B and C, it will be assumed that during normal operation in the astern direction the disc 60 and gear 74 will be rotating clockwise at the rate of 200 R. P. M. The motor 77 will be arranged to drive the gear 76 clockwise at a speed of 10 R. P. M. The disc 71 and gear 80 will, therefore, be rotating in a clockwise direction at a speed of 105 R. P. M. Motor 83 will be arranged to drive gear 82 in a counterclockwise direction at a speed of 100 R. P. M. Disc 73 will, therefore, be operating in a clockwise direction at a speed of 2½ R. P. M. Discs 60, 71 and 73 are, therefore, rotating clockwise and relays A, B and C are therefore shown in the down position. As shown, controller finger g is energized to complete a circuit through contacts $A^4$ and $C^4$ to energize line 89. A circuit is completed from line 89 through interlock contact $54^a$ of switch 54 to the operating coil of switch 51 which maintains switch 51 closed, thus maintaining normal excitation on the motor field winding. A circuit is also completed from line 89 through interlock contact $53^a$ of switch 53 to maintain switch 52 closed, thus maintaining normal excitation on the generator. If the command full speed ahead is now given, the controller 57 will be thrown to the full ahead position and as it goes through off position, the excitation switches and line contactors will fall out as in the arrangement shown in Fig. 1. Controller segment 58 then energizes controller fingers a and c to close contactors 7, 8, and 10 to reverse the phase rotation between generator and motor 70 and simultaneously energizes controller finger e to reverse the direction of rotation of the constant speed motor 77. Disc 71 of relay B, therefore, drops in speed from 105 R. P. M. to 95 R. P. M. Disc 73 of relay C, therefore, immediately reverses from clockwise to counterclockwise, moving relay C to its upper position. When the controller segment 58 energizes contact finger h no circuit is completed for the reason that contact $B^3$ is open. In the final position of the controller segment 58, fingers i and j are energized. Finger j completes no circuit for the reason that contact $A^1$ is open. Finger i completes a circuit through contact $B^4$ and interlock contact $51^a$ of switch 51 to close switch 54. The closing of switch 54 applies overexcitation to the motor field winding and causes the motor to operate as a synchronous generator to break the propeller from the water and rapidly decelerate it. Motor 83 is now energized through transformer 88 and rotates at a speed depending on the frequency of the braking currents. This motor, therefore, slows down with the propeller, but disc 73 of relay C continues rotating in a counterclockwise direction at a constant speed of 2½ R. P. M. as long as the disc 71 of relay B continues to rotate in a clockwise direction. When the gear 74 reaches a speed of 10 R. P. M. clockwise the disc 71 will stop. The propeller 6 will be rotating at but five per cent of its normal speed with normal generator frequency, and the torque required to hold the propeller and reverse it will be within the capacity of the propeller driving motor operating as an induction motor. As the speed of the propeller falls still further disc 71 of relay B reverses and the passage of the first notch in the disc closes contacts $B^1$ and $B^3$ as above described. Closing of contact $B^1$ has no effect, since controller finger k is not energized at this time. Closing of contact $B^3$ completes a circuit from controller finger h through contact $A^2$ and interlock contact $52^a$ of switch 52 to close switch 53 and apply overexcitation to the generator field winding. An interlock contact $51^b$ of switch 51, connected to line 90 is arranged in parallel with contact $A^2$ for a purpose hereinafter set forth. The disc 71 of relay B is rotating slowly at this time and the generator field current has time to attain its full value before the second notch of disc 71 causes contacts $B^2$ and $B^4$ to open. Opening of contact $B^2$ has no effect, since controller finger e is at this time deenergized. Opening of contact $B^4$ interrupts the circuit leading from controller finger i through interlock contact $51^a$ to switch 54. Switch 54, therefore opens and deenergizes the motor field winding. The system now operates with excess field on the generator and no field on the motor thus giving strong induction motor action to reverse the propeller and accelerate it in the ahead direction. As soon as induction motor connections are established, the motor 83 is reversed and jumps into synchronism with the generator. If the generator were at full speed, the gear 82 would now be rotating clockwise at a speed of 100 R. P. M. Since disc 71 is practically at standstill, disc 73 immediately reverses for the second time now running clockwise with a speed of substantially 50 R. P. M. This movement of relay C to its down position does not establish or interrupt any control circuits not established or interrupted elsewhere at this time. When the propeller reaches standstill disc 71 of relay B will be rotating counterclockwise at 5 R. P. M. and disc 73 of relay C will be rotating clockwise at a speed of $47\frac{1}{2}$ R. P. M. As the propeller reverses, relay A moves to its upper position, but neither makes nor breaks any circuit not made or broken elsewhere at this time. The opening of contact $A^2$ has no effect since this contact at this time is shunted by contact $C^2$ as well as by contact $51^b$. Discs 60 and 71 of relays A and B are now rotating counterclockwise while disc 73 of relay C is rotating clockwise. With a primary frequency of 60 cycles, disc 60 will be rotating counterclockwise at 190 R. P. M. when the slip reaches a value of three cycles. Disc 71 will be rotating counterclockwise at a sspeed of 100 R. P. M. and disc 73 will be standing still. As the propeller exceeds a speed corresponding to a slip of three cycles, disc 73 of relay C reverses for the third and last time and begins to run counterclockwise. Closing of contact $C^1$ completes a circuit from controller finger $j$ through contact $A^1$ and $C^1$ to line 89. Switch 54 being open, a circuit is completed from line 89 through interlock contact $54^a$ to close switch 51 and apply normal excitation to the motor to bring it into step with the generator. The energization of line 89 also completes a circuit through interlock contact $52^b$ of switch 52, which is now open, thus causing switch 55 to close completing a circuit in parallel with switch 53 through resistor 56. Excess field is still maintained on the generator by means of switch 53 which is energized from controller finger $h$ through contact $B^3$, $C^2$ and $52^a$. It will be noted that contact $51^b$, which when closed shunts contact $C^2$, is now open. The speed of this reversal of disc 73 and the spacing of the notches thereof is such as to maintain contacts $C^1$ and $C^2$ both closed long enough to permit the current in the motor field winding to build up to its normal value. When contact $C^2$ opens, switch 53 opens but the excitation circuit of the generator remains completed through resistor 56 and switch 55. The opening of switch 53 closes contact $53^a$ which immediately closes switch 52 to apply normal excitation to the generator. Closing of switch 52 opens contact $52^b$ which causes switch 55 immediately to open. During a short interval of time it will be observed that switches 55 and 52 are both closed. Resistor 56 is, therefore, provided to prevent a short-circuit between lines 48 and 49 of the three-wire system during the transition of the generator excitation connections from overexcitation to normal excitation. The system is now in normal operation in the ahead direction with discs 60, 71 and 73 of relays A, B and C rotating counterclockwise. The operation of the system in changing from full-speed-ahead to full-speed-astern will be obvious from the description of the operation of the system in changing from full-speed-astern to full-speed-ahead which operation has just been set forth in detail.

If, while the system of Fig. 2 is operating at full-speed-ahead, it is desired to allow the ship to drift, the controller 57 will merely be thrown to off position to interrupt the excitation circuits and open the line contactors. Motors 77 and 83 will immediately stop bringing gears 76 and 82 to a standstill. The propeller 6 will be driven by the water and the gear 74 will decelerate slowly as the speed of the ship gradually falls. Disc 60 of relay A will be rotating counterclockwise and gradually decreasing in speed. Disc 71 of relay B will be operating counterclockwise with half the speed of disc 60. Disc 73 of relay C will be operating counterclockwise with half the speed of disc 71. All of the relays will, therefore, remain in their upper position. Assume now that the operator desires to resume operation in the ahead direction. If, while drifting, the propeller speed has dropped, for example, to one-half the normal speed the disc 60 will be rotating at 100 R. P. M. counterclockwise. When the controller is thrown to ahead position motor 77 immediately starts into operation at 10 R. P. M. counterclockwise. Disc 71 will, therefore, begin to rotate at 55 R. P. M. If motor 83 is standing still disc 73 will tend to rotate at $27\frac{1}{2}$ R. P. M. It is apparent, therefore, that if motor 83 is not started into operation before controller finger $j$ is energized, a circuit will be completed through $A^1$ and $C^1$ to energize line 89 and complete circuits to the operating coils of switches 51 and 52 through interlock contacts $54^a$ and $53^a$ respectively. Normal excitation would, therefore, be applied to both motor and generator. This is the condition for normal synchronous operation, however, and is not an operative condition where the propeller is so far below synchronous speed as it is under the conditions assumed. That is to say, the synchronizing connections would be established while the slip had a value of thirty cycles, whereas the slip would not be greater than three cycles when connections are established for synchronous operation. If these conditions were permitted to obtain, motor 83 would have impressed thereon two frequencies, one the frequency of the generator, and the other the frequency of the motor now being driven as a generator by the propeller. The frequency of the currents due to the motor would decrease as the propeller decreased in speed. The synchronous connections could only be broken and induction motor connections established by reversing disc 73 to cause it to run clockwise. To accomplish this reversal, however, it would be necessary for motor 83 to get into synchronism with the generator, but inasmuch as the motor 83 starts from standstill with the motor and generator both excited, this motor would run on the resultant torque curve due to these two frequencies, and, inasmuch as the resultant torque curve passes through zero, motor 83 could not get into synchronism with the generator until the ship had proceeded with generator and motor out of step long enough to stop the propeller. It is, therefore, important to insure that the motor 83 shall, under these conditions, reverse the disc 73 and relay C before controller finger $j$ is energized. To insure this operation interlock contact $51^b$ is provided on switch 51 to close a circuit from controller finger $h$, through $B^3$, line 90, and contacts $51^b$ and $52^a$, to close switch 53 and apply overexcitation to the generator before controller finger $j$ is energized by controller segment 58. Motor 83 therefore jumps into synchronism with the generator and moves relay C to the down position before controller finger $j$ is energized. Induction motor connections are now established to accelerate the propeller. Discs 60 and 71 are rotating counterclockwise, and, when the slip falls below three cycles, relay C will reverse to establish synchronizing connections as heretofore set forth in connection with the description of the operation in going from astern operation to ahead operation. The operation of the system in passing from ahead operation to astern operation should be obvious from the description given. In order, however, to set forth the functions of all of the contacts shown, the operation of changing from drifting astern to full speed astern will be briefly delineated. During drifting astern, discs 60, 71 and 73 will be rotating clockwise and relays A, B, and C will be in the down position. The line contactors and excitation switches will be open. As in the case of changing from drifting ahead to full speed ahead, as above set forth, it will be assumed that the disc 60 is rotating at half normal speed or 100 R. P. M. As the controller is thrown from off position to astern position it first energizes controller finger $l$ to complete a circuit through contact $B^2$, line 91, contact $51^c$, and contact $52^a$ to close switch 53 and apply overexcitation to the generator. Contact $51^c$ therefore performs the same function during this maneuvering operation that the contact $51^b$ performed during the operation of changing from drifting ahead to full-speed ahead. The motor 83 therefore jumps into synchronism with the generator and reverses the disc 73 to counterclockwise, moving the relay C to its upper position before controller finger $g$ is energized. Disc 60 and 71 are, therefore, rotating clockwise and disc 73 counterclockwise. When the propeller speed corresponds to a slip of three cycles, disc 73 reverses to close a circuit from controller finger $g$ through $A^4$ and $C^4$ to line 89 to establish synchronizing connections. It is apparent that controller finger $k$ performs the same functions in going from standstill or ahead operation to astern operation that controller finger $i$ performs in going from standstill or astern operation to ahead operation, and it is believed to be unnecessary to describe further maneuvering operations, for the reason that, from what has been set forth, it is evident that it is impossible to manipulate the controller in a manner to establish improper connections, and that, therefore, no thought or skill is required to enable the operator to execute any desired maneuver.

It is obvious that my invention is not limited to any particular type of relay to perform the functions set forth for relays A, B and C. It is apparent to those skilled in the art that many modifications, both of the type of switch shown and of the drum type, may be adapted to make and break the connections controlled by these relays. It is also evident that my invention is not limited to the particular arrangement of connections and interlocking contacts disclosed, since these may be arranged in various ways to perform the functions of the apparatus.

The purpose of arranging the contacts of relays B and C so that one field will be permitted to build up before the other is de-energized may be seen by observing what would happen if, when the apparatus was in condition for the establishment of connections for synchronous operation, the motor field circuit should be interrupted before the generator field circuit were completed. As is well known to those skilled in the art an appreciable interval of time is needed for the current in a field winding to rise to its normal value and during this interval the propeller would slip away.

That is to say, the propeller driving motor speed would be so far below synchronism by the time the generator field current reached an operative value that the synchronous torque would be insufficient to pull the motor into step with the generator.

While I have described a completely automatic system for performing the various maneuvering operations necessary in a ship propulsion system, it is apparent, if simple manual operation is desired, that the various line contactors and excitation switches may be operated by direct manual action, if desired, it being merely desirable that the line and excitation switches be interlocked so that line switching may be done only when the excitation circuits are broken. It is also apparent that throw-over switches may be provided, if desired, for disconnecting the automatic mechanism involving relays A, B and C and completing circuits to operate the line contactors and excitation switches directly.

In Fig. 4 of the drawings I have shown a modified arrangement which permits of greatly simplifying the connections of the disc operated relays. Constant speed motor 92 is, in this modification, arranged to run in the same direction with either position of controller 93. To accomplish this result its field and armature are both energized from controller finger c. Shaft 75 upon which gear 74 is mounted is arranged to be driven by a reversible motor 94 supplied from a small synchronous generator 95 on the propeller shaft. The field winding 94' of motor 94 is energized from controller finger c. The controller finger c is also arranged to supply current to the slip rings 96 and 97 which supply the field winding of generator 95. Controller fingers m, n, o, p, cooperating with controller segments 98, 99, 100 and 101 are arranged to reverse the phase rotation between generator 95 and motor 94 when the controller is thrown from one position to the other. Motor 102, which corresponds to motor 83 in Fig. 2, is connected through transformer 103 to the terminals of the generator stator winding, as distinguished from the arrangement of Fig. 2, in which motor 83 is connected to the terminals of the propeller motor stator winding. It is apparent that, as thus arranged, the operation of line contactors 7 to 11 to reverse the phase rotation will reverse motor 102 only during synchronous braking.

The operations of relays A', B' and C' of Fig. 4 and the connections controlled thereby may be most readily explained by considering the operation of the system in passing from astern operation to ahead operation. With the controller 93 in the astern position segment 98 will bridge controller fingers m and n and segment 99 will bridge controller fingers o and p, to connect the generator 95 to operate the motor 94 to drive disc 60 of relay A' in a clockwise direction. Controller fingers c and d will be energized to close line contactors 7, 9 and 11 for astern operation. Motor 92 will be energized from controller finger c and will be arranged to operate so as to drive the gear 76 at 10 R. P. M. clockwise. Disc 71 of relay B' will, therefore, be operating at 105 R. P. M. clockwise if disc 60 is operating at 200 R. P. M. Motor 102 will be arranged to drive gear 82 at 100 R. P. M. counterclockwise. Disc 73 of relay C' will, therefore, be operating at a speed of 2¼ R. P. M. clockwise. Relays A', B' and C' will, therefore, be in their down positions as shown in Fig. 4. A circuit will be completed from controller finger q through contacts A'² and C'² to energize line 89, which, through interlock contacts 54ª and 53ª, will maintain switches 51 and 52 closed to apply normal excitation to both generator and motor for normal synchronous operation in the astern direction. Assume now that the controller is thrown over to full ahead position. As the controller goes through off-position all of the contactors and excitation switches will drop out. The first position of controller segment 105 will energize controller fingers a and c to close contactors 7, 8 and 10 for ahead operation. Simultaneously, with the energization of controller fingers a and c controller segment 100 will bridge fingers o and n, and controller segment 101 will bridge fingers m and p to reverse the phase rotation between generator 95 and motor 94. Inasmuch as the field windings of generator 95 and motor 94 are energized from line c, the motor 94 will immediately reverse and begin to operate the disc 60 and gear 74 counterclockwise at the speed of the propeller. Motor 92, being energized from controller finger c, will also immediately begin to operate at 10 R. P. M. clockwise. Disc 71 will, therefore, immediately reverse and begin to rotate counterclockwise. Relays A' and B' are, therefore, immediately moved to their upper position. The next position of the controller segment 105 energizes controller finger r, but this finger establishes no circuit since contact B'¹ is now open. Controller segment 105 in its final position energizes controller finger s to complete a circuit through contact B'² and interlock contact 51ª to close switch 54 and apply overexcitation to the motor field winding. Synchronous braking is thus established and the motor 102 is reversed and begins to operate gear 82 clockwise at a speed proportional to the speed of the propeller. If it be imagined, that, at this instant, the propeller is still rotating at full speed, we may assume, as in the case of Fig. 2, that the disc 60 is rotating at 200 R. P. M. counterclockwise. Disc 71 will, therefore, be rotating at 95 R. P. M. counterclockwise and disc 73 will be rotating at 2½ R. P. M. clockwise. The propeller is, therefore, quickly decelerated and when disc 60 falls below 10 R. P. M., disc 71 will reverse and relay B' will be moved to its lower position. At the instant of reversal of disc 71, disc 73 will still be rotating clockwise at a speed of 2½ R. P. M. The reversal of relay B' first closes contact B'¹ to establish a circuit from controller finger $r$ through contact A'¹ and contact 52ª to close switch 53 and apply overexcitation to the generator field winding. It will be observed that interlock contact 51ª' of switch 51 is in parallel with contact A'¹. The function of contact 51ª' will be set forth hereinafter in connection with the description of operation in passing from drifting in a certain direction to full speed in that direction. After an interval of time sufficient to permit the generator field winding to build up, contact B'² will open to interrupt the circuit leading from controller finger $s$ to switch 54 which will, therefore, open to deenergize the motor field circuit. Motor 102 now immediately reverses and jumps into synchronism with the generator and begins to rotate gear 82 counterclockwise, and this speed of rotation, under the assumption that the generator is running at normal speed, will be 100 R. P. M. Disc 73 will, therefore, immediately reverse and begin to run counterclockwise at a speed of approximately 50 R. P. M. which speed will fall as the propeller stops and reverses. This reversal of relay C' has no effect for the reason that at this time the circuit of contact C'² is open at A'² and the circuit completed by contact C'¹ is shunted by contact A'¹. Relay A' reverses with the propeller and begins to run clockwise again. At the time the propeller and disc 60 reverse, disc 71 will be rotating clockwise at 5 R. P. M. and disc 73 will be rotating counterclockwise at 47½ R. P. M. The reversal of relay A' does not at this time make or break any circuit not otherwise made or broken elsewhere, for the reason that relay C' is now in its upper position so that contact A'¹ is shunted by contact C'¹ and the circuit of contact A'² is broken at contact C'². When the propeller driving motor has been so far accelerated in the ahead direction that the slip has fallen to three cycles, disc 60 will be rotating at 190 R. P. M. clockwise, disc 71 at 100 R. P. M. clockwise and disc 73 will be standing still. When the slip falls below three cycles, disc C' again reverses and begins to run clockwise. Relay C' is moved to its down position and the synchronizing connection is established from controller finger $q$ through contact A'² and C'² to line 89. Line 89, through contact 54ª, closes switch 51 to apply normal excitation to the motor field winding. The closing of switch 51 opens interlock contact 51ª', but the opening of this interlock does not cause switch 53 to open, for the reason that the coil of this switch remains energized from controller finger $r$ through contacts B'¹ and C'¹ and interlock 52ª. After an interval sufficient to permit the motor field current to build up, contact C'¹ breaks the circuit just traced to open switch 53 and close switch 52 to reduce the generator excitation to normal as above set forth in connection with Fig. 2.

It will be observed that in the modification shown in Fig. 4, the discs 60, 71 and 73 have the same direction of rotation for synchronous operation in the ahead direction that they have for synchronous operation in the astern direction. Assume now that during synchronous operation in the ahead direction the controller is moved to off-position and the ship allowed to drift. Motors 92, 94 and 102 will stop and the discs 60, 71 and 73 will come to a standstill. If the command full speed ahead be now given, the controller will be thrown to ahead position and motor 94 will begin to drive the disc 60 clockwise at a speed corresponding to the speed of the propeller. Disc 71 will also begin to rotate clockwise. When controller segment 105 energizes finger $r$, a circuit is completed through contact B'¹ and interlock contact 51ª', and interlock contact 52ª to close switch 53 immediately to apply over excitation to the generator for induction motor operation. If contact 51ª' were omitted no circuit would be completed by controller finger $r$ at this time, for the reason that contacts A'¹ and C'¹ are open. With such arrangement of parts, controller finger $q$ would establish a circuit through contacts A'² and C'² to line 89 to apply normal excitation to both motor and generator, although, the slip is too great for the establishment of connections for synchronous operation. By the provision of contact 51ª', however, switch 53 has been closed, as above indicated, and motor 102 will have reversed disc 73 to move the relay C' to its upper position before controller finger $q$ is energized. The energization of controller finger $q$ therefore, has no effect. The energization of controller finger $s$ has no effect for the reason that contact B'² is open. When the slip has fallen to three cycles, disc C' will reverse to run clockwise and move relay C' to its lower position to establish synchronizing connections as above set forth in connection with the description of the operation in passing from full-speed-astern to full-speed-ahead.

It is believed that the operation of the modification shown in Fig. 4 in passing from full-speed-ahead to full-speed-astern will be obvious from the description of the reverse operation heretofore set forth in detail.

The modification shown in Fig. 5 represents a still further simplification of the disc operated relay mechanism and diagrammatically indicates the interrelation of the electric controller and turbine speed levers. Fig. 5 also diagrammatically indicates means automatically operating to increase the stability of normal synchronous operation. In this arrangement, the motor 102' which corresponds to the motor 102 of Fig. 4 is arranged so that it cannot drive the gear 82 backwards or, in the example assumed, clockwise. Fig. 5 shows a ratchet 106 and pawl 107 to prevent reversal of the motor 102', thus preventing reversal of gear 82. It is apparent, however, that my invention is not limited to any particular means for preventing reverse operation of the gear 82. It is obvious that, if desired, an overrunning clutch may be provided which will permit the motor 102' to revolve in the reverse direction without carrying with it the differential mechanism which it operates when turning in the normal direction. Motor 102' is connected through transformer 103 to the terminals of the generator stator winding 3, as in Fig. 4. As will appear from the description of operation hereinafter set forth, this arrangement enables the combination to function as though a direction relay, corresponding to the relays A and A' of Figs. 2 and 4, were present, although such relay with its contacts is physically eliminated. In other words, the combination of Fig. 5 includes means for eliminating synchronous braking when it is undesirable and unnecessary, although the means is quite different structurally from the means for performing this function in Figs. 2 and 4. The two remaining relays operated by discs 71 and 73 are shown at B'' and C'' in Fig. 5. The connections of motors 92 and 94 and generator 95 are identical with the connections for these elements shown in Fig. 4. The excitation circuits and switches of Fig. 5 are the same as the corresponding elements of Fig. 4. Adjustable resistances 108 and 109 are provided in the circuits of the motor and generator field windings respectively to enable the excitation currents to be adjusted to any desired values. It is obvious that such adjustable resistances may be used in the arrangements of Figs. 2 and 4, but inasmuch as the invention delineated in said arrangements is not concerned with such resistances, they have not been there illustrated. In the modification shown in Fig. 5, however, means are provided for increasing the stability of operation of the system and such means is there arranged to cooperate with these field circuit resistors. The means for increasing the stability of operation comprises a device 110 having a conducting ring 111 provided with insulating segments 112 and cooperating brushes 113 and 114. The conducting ring 111 is mounted on the planet carrier of a differential mechanism comprising a gear 115 driven from the shaft 75 of motor 94 and a gear 116 driven from the shaft of motor 102'. During normal synchronous operation gears 115 and 116 are arranged to rotate in opposite directions and the ring 111, therefore, stands still. It is apparent that during normal synchronous operation of the system, the rotating element 5 of the propeller driving motor will vary its angular position, with respect to the position of the rotating element of the generator, with variations in load. The rotating element of motor 94 will vary in angular position with variations in angular position of the rotatable element 5, since motor 94 is supplied from generator 95 which is on the propeller shaft. The rotatable element of motor 102', however, will remain in fixed angular relation with respect to the rotatable element of the generator. It is apparent, therefore, that any variation in load on the propeller driving motor which causes its rotatable element to lag with reference to the rotatable element of the generator, will cause a corresponding variation in the rotation of gear 115 with respect to gear 116. As is well known to those skilled in the art, the angular lag of the rotating element of a synchronous motor increases with increasing load. When the angular lag increases beyond a predetermined value for any operating condition the motor tends to fall out of step and stop. The angular lag is, therefore, a measure of the stability of operation of the motor. The device 110 is arranged so that during normal synchronous operation within the stable range the brushes 113 and 114 remain on insulating segments 112. The brushes engage ring 111 to complete a circuit from controller finger c through coil 117 and interlock contacts 51$^d$ and 52$^d$ to close contacts 117$^a$ and 117$^b$ to short-circuit resistors 109 and 108 respectively. Short-circuiting these resistors increases the field strength of both motor and generator, thus restoring stable operation. A contact arm 118 is arranged to be operated by ring 111 to complete a circuit from controller finger c to lamps or other devices 119 or 120 to provide a visual or other indication of the condition of the system as concerns stability of operation.

It has heretofore been proposed to facilitate maneuvering by reducing the speed of the turbine during maneuvering operations. One arrangement which has been proposed for this purpose is shown in Fig. 5 in which the electric controller operating lever 121 is interlocked with the steam or speed lever 122, which is arranged to control the governor setting on the turbine 1 in any desired manner, one such arrangement being shown, for example, in the United States patent to Emmet No. 1,137,308, to which reference has been made heretofore. As shown, the steam lever 122 is provided with a cam 123 cooperating with a pivoted member 124 arranged to engage notches in a disc 125 secured to the lever 121. The arrangement is such that the electric control lever cannot be operated to establish maneuvering connections until the steam lever has been moved to a position which will reduce the speed of the turbine to a value where maneuvering may be accomplished with certainty. A small pivoted lever 126 is biased to a position where it stops the steam lever 122 in the maneuvering position, but if it is desired to operate continuously at a still lower speed this may be accomplished by voluntarily moving the member 126 out of the way of lever 122.

The operation of the modification shown in Fig. 5 will be set forth beginning with the ship at standstill. Assuming that it is desired to go ahead, steam lever 122 will be moved to the maneuvering position after which controller lever 121 may be thrown to cause controller segments 100, 101 and 105 to engage the controller contact fingers. The first step of the controller will energize fingers $a$ and $c$ to close contactors 7, 8 and 10 for ahead operation. The energization of controller finger $c$ also starts motor 92 into operation and energizes the field windings of motors 94 and 102'. Controller segments 100 and 101 cooperate with controller contact fingers $m$, $n$, $o$, $p$, to establish a certain phase of rotation between generator 95 and motor 94 as in Fig. 4. Since, with the ship at standstill, the propeller is at standstill, motor 94 does not at once start into operation. With the same assumption in regard to speeds of rotation that has been made heretofore, motor 92 will at once begin to rotate to drive the gear 76 at 10 R. P. M. clockwise. The field circuit of the generator not being completed at this time, motor 102', will remain at standstill and motor 92 will, therefore, start discs 71 and 73 of relays B'' and C'' into rotation clockwise. The second position of the controller energizes controller finger $t$ to complete a circuit through contacts B''$^1$, 51$^d$ and 52$^d$ to close switch 53 to apply overexcitation to the generator field winding. This causes the generator field current to build up quickly thus starting motor 102' into rotation at its full speed of 100 R. P. M. counterclockwise. Disc 73 is, therefore, reversed and relay C'' moved into its upper position. The controller having by this time been moved to its full ahead position, controller fingers $u$ and $v$ are energized. Controller finger $u$ completes no circuit with relay C'' in the upper position, since contact C''$^2$ is open. If the controller were constructed to permit of very quick motion to its full ahead position, controller finger $u$ might be energized before contact C''$^2$ is broken, in which case a circuit would be completed from finger $u$ through contact C''$^2$ to line 89 and thence through interlock contact 54$^a$ to close switch 51 and apply normal excitation to the motor field winding. Even though this should take place no harm would result, since the motor 102' would cause the disc 73 to reverse almost instantly, thus interrupting the operating circuit for switch 51 at contact C''$^2$. The energization of controller finger $v$ has no effect at this time for the reason that contact B''$^2$ is open. Induction motor action obtains to accelerate the propeller driving motor, and at a speed corresponding to 190 R. P. M. of gear 74 disc 71 will be rotating at 100 R. P. M. clockwise and disc 73 will be standing still. As the motor exceeds this speed, which corresponds to three cycles slip in the example taken, disc 73 again reverses and begins to run clockwise. Closing of contact C''$^2$ completes a circuit from controller finger $u$ through contact 54$^a$ to close switch 51 and apply normal excitation to the motor field winding to bring the motor into step with the generator. Closing of switch 51 opens interlock contact 51$^d$ but switch 53 is nevertheless maintained closed through a circuit leading from controller finger $t$ through contacts B''$^1$ and C''$^1$ and contact 52$^d$. After an interval sufficient to permit the motor field current to build up to its normal value contact C''$^1$ opens to open switch 53. The opening of switch 53 causes switch 52 to close and reduce the generator excitation to normal as in the modifications shown in Figs. 2 and 4. Normal synchronous operation now obtains and the steam lever 122 may be moved to set the turbine governor for any desired speed of the ship. Rheostats 108 and 109 will be adjusted for the most efficient conditions of operation. If a sudden increase of load is now imposed upon the propeller driving motor as might happen were the rudder to be suddenly thrown to one side, for example, the rotating element of the motor will lag an amount sufficient to permit an increased torque to be developed in the motor, and if the amount of lag exceeds that predetermined value which indicates that a condition of instability is being approached, ring 111 of the device 110 will rotate to cause a circuit to be completed from controller finger $c$ through brushes 113, 114, coil 117 and interlock contacts 51$^d$ and 52$^d$, which are now closed in their upper positions. The energization of coil 117 closes contacts 117$^a$ and 117$^b$ to short-circuit resistors 108 and 109 to increase the excitation of the motor and the generator to restore stable conditions of operation. It is apparent that increased stability may be secured by short-circuiting either resistor 108 or 109, but I prefer to control both resistors. Short-circuiting of these resistors will ordinarily produce more excitation than is necessary for stable operation, in which case the angular lag of the motor will be so reduced that the circuit of coil 117 will be interrupted by the device 110. Resistors 108 and 109 will, therefore, be reinserted in the motor and generator field circuits. Coil 117 will, therefore, be intermittently energized as long as the necessity for increased excitation exists. Each time coil 117 is energized, arm 118 will preferably be arranged to flash device 119, which may be a red lamp or other danger signal, to advise the operator that resistors 108 and 109 need adjustment to provide increased excitation. While reference has been made to a sudden increase of load, it is apparent that a gradual increase of load such as to decrease the stability of operation to the danger point will cause the device 110 to operate. If at any time the excitation is greater than that necessary for stable operation, the angular lag will be reduced to such a low value as to cause the arm 118 to complete the circuit of the signal device 120, which may be a green lamp or other signal, to advise the operator that the excitation is greater than necessary for efficient and stable operation. I have represented the device 110 as provided with four arms 118 for the reason that I have assumed that the synchronous motors 94 and 102' are four pole motors. As thus arranged, the ring 111 may be in any one of four positions when normal synchronous operation begins. It is apparent that during maneuvering ring 111 may be rotating at a considerable rate of speed and in order to limit the action of coil 117 to normal synchronous operation interlock contacts 51$^d$ and 52$^d$ are provided on switches 51 and 52, which interlock contacts are both closed only when connections for normal synchronous operation are established.

Resistors 108 and 109 may, if desired, be automatically adjusted by any suitable form of pilot motor operated by the device 110. In Fig. 5 the pilot motor is fully illustrated in connection with resistor 108 only. The pilot motor shown comprises an armature 127 and field winding sections 128 and 129. The engagement of arm 118 of device 110 with the contacts completing the circuit of device 119 completes a circuit through winding 128 and armature 127 to operate the pilot motor in a direction to reduce the resistance of resistor 108. Engagement of arm 118 to establish the circuit of device 120 completes a circuit through winding 129 and armature 127 of the pilot motor to increase the resistance of resistor 108. It is obvious that if desired the pilot motor may be arranged to have its circuits completed either earlier or later than the completion of the circuits of devices 119 and 120. It is apparent that the pilot motor arrangement for adjusting the resistors 108 and 109 may be used either instead of or in addition to the controlling means comprising the coil 117. I prefer, however, to use both of these devices, for the reason that the arrangment comprising the coil 117 is peculiarly adapted for wide and sudden changes in load, while the more slowly operating pilot motor is not so well adapted to produce sudden and great changes in the excitation. It is apparent that when the pilot motor is used in addition to the arrangement comprising coil 117 the pilot motor will inch the movable member of the rheostat along until the coil 117 ceases its intermittent operation. It is also apparent that the resistance will be automatically increased whenever the excitation is greater than necessary for stable and efficient operation. No particular construction is illustrated permitting the adjustment of the resistance 108 and 109 by either manual or pilot motor operation for the reason that these features are well known in the art, it being obvious that manual adjustment may be made either by arranging the rheostat arms to be moved independently of the transmission from the pilot motor or by controlling the pilot motor circuits by push buttons in shunt to the contacts of device 110. It is obvious that my invention is not limited to any particular construction of the device 110, but, on the contrary, includes any means that will operate in the combination to perform the functions performed by this device. It is apparent that the pilot motor circuit should be arranged to be completed only during normal synchronous operation and the armature 127 will, therefore, be connected in circuit with interlock contacts on switches 51 and 52 just as the coil 117 is connected.

It is apparent that means similar to the device 110 of Fig. 5 for increasing the stability of synchronous operation may be applied to the arrangements shown in Figs. 2 and 4 if desired. Where such device is applied to an arrangement like that in Fig. 2, in which the shaft 75 operates in one direction for synchronous operation ahead and in the other direction for synchronous operation astern, it is apparent that any backlash in the gearing operating device 110 may vary the point at which the regulation for stability begins to take place. In order to cure this defect, it may be desirable to slightly shift the brushes 113 and 114 at the time the controller is thrown to change the direction of operation of the ship. It is also apparent that brushes 113 and 114 may be adjusted in Fig. 5 to vary the point at which regulation for stability begins. It is further apparent that the contacts engaged by arm 118 may be adjusted to control the point of operation of the pilot motor and signal devices.

The operation of the modification shown in Fig. 5 when starting from standstill, and synchronous operation in the ahead direction, have been set forth in detail, and in order to complete the description of this modification, it is believed to be merely necessary to set forth briefly the operation of the various elements in passing from full-speed-ahead to full-speed-astern. When the controller passes through the off-position all of the line contactors and excitation switches fall out. The first step of the controller in the astern position closes line contactors 7, 9 and 11 and sets motors 92 and 94 into operation just as in the arrangement shown in Fig. 4. Motor 94 therefore rotates gear 74 at 200 R. P. M. counterclockwise. Motor 92 operates gear 76 at 10 R. P. M. clockwise and disc 71 of relay B″ therefore rotates counterclockwise at a speed of 95 R. P. M. The counterclockwise rotation of disc 71 causes disc 73 to rotate counterclockwise at a speed of 47½ R. P. M. Relays B″ and C″ are, therefore, at once thrown to their upper positions. When controller segment 104 energizes contact fingers $t$ and $u$ no circuits are completed for the reason that contacts B‴¹ and C‴² are open. Energization of controller finger $v$ completes a circuit through contact B″² and interlock 51ᵃ to close switch 54 to establish synchronous braking connections. Motor 102′ being locked against reverse rotation by ratchet 106 and pawl 107 does not reverse gear 82, and disc 73 therefore continues to rotate at half the speed of disc 71. When the speed of gear 74 falls below 10 R. P. M. disc 71 reverses and moves relay B″ to its lower position closing contact B‴¹ completing a circuit from controller finger $t$ through B‴¹ and contacts 51ᵈ and 52ᵈ to close switch 53 to apply overexcitation to the generator field winding. The circuit closing switch 53 is also completed from controller finger $t$ through contacts B‴¹ and interlock 52ᵈ. While the reversal of disc 71 tends to reverse disc 73 it is apparent that disc 73 may be arranged so as not to move relay C″ far enough to change its connections during the movement of relay B″ to close contact B‴¹. This arrangement is easily possible, even where disc 73 is provided with the same number of notches as disc 71, since, during the time in question, disc 73 is moved with but half the speed of disc 71. Upon the closing of switch 53 and the building up of the generator field current, motor 102′ begins to rotate in synchronism with the generator, and the gear 82 begins to rotate counterclockwise, thereby retaining the relay C″ in its upper position. After an interval of time sufficient to permit the current in the generator field winding to build up, contact B‴² will have opened to open switch 54 and deenergize the motor field winding. Induction motor connections are now established and the propeller is reversed and accelerated in the astern direction. When the gear 74 exceeds a speed of 190 R. P. M., disc 73 reverses and moves relay C″ to its lower position. The closing of contact C‴² completes a circuit from controller finger $u$ to line 89 to establish synchronizing connections and initiate normal synchronous operation as in Fig. 4.

It is apparent that, with the arrangement shown in Fig. 5, if the ship is drifting in either direction the relays B″ and C″ will remain in their down positions. If the controller is then thrown for operation in the direction in which the ship is drifting, the energization of controller finger $t$ will complete a circuit through contact B‴¹ and contacts 51ᵈ and 52ᵈ to close switch 53 to establish connections for induction motor operation without going through the operation of synchronous braking. At this time contact C‴¹ is open, but the circuit of coil 53 is maintained closed by contact 51ᵈ which is in parallel with C‴¹.

It will be observed that, in the arrangements disclosed in Figs. 2, 4 and 5, variations in the generator frequency and variations in the generator voltage do not disturb the operation of the mechanism which always performs its functions at the same predetermined number of cycles slip.

Fig. 6 represents a practical construction of the differential gear mechanism shown more or less diagrammatically in Figs. 2, 4 and 5. The parts have been numbered as far as possible to agree with the numbering of the corresponding elements in Figs. 2, 4 and 5. The shaft 130 is the main shaft of the differential gear mechanism on which is keyed to the direction relay 60, bevel-gear 74 and gear 131. Shaft 130 may be driven either directly from the propeller shaft, as in Fig. 2, or may be motor-driven as in Figs. 4 and 5. Worm gear 79 carrying gear 76 is loosely mounted on shaft 130. Planet carrier 86 is attached to gear 80 loosely mounted on shaft 130. Planet carrier 86 carries disc 71. Gear 82, attached to worm gear 85, is loosely mounted on shaft 130 and planet carrier 87 carries disc 73. The shaft 132 of motor 83, upon which worm gear 84 is mounted, is extended and arranged to drive gear 116 of the differential stability control mechanism, the other gear 115 of which is driven in the opposite direction to gear 116 from gear 131, through gears 133, 134 and 135. Ring 136 corresponds to the ring 111 of the device 110 of Fig. 5.

In the modifications heretofore described, the propeller motor has been arranged to operate as a synchronous machine for braking purposes and for normal operation. My invention is, however, very advantageous for the pure induction motor ship, and Fig.

7 diagrammatically represents a ship propulsion system in which the synchronous generator 3 is arranged to supply the induction motor 137 which is directly connected to the propeller 6. Slip rings 138 permit of connecting resistors 139 in the secondary circuit of the motor for starting and reversing and contactors 140 are arranged to short-circuit resistors 139 as hereinafter described. The turbine 1 is provided with any suitable form of adjustable speed governor 141, the mechanism illustrated being that of Emmet Patent No. 1,137,308 heretofore referred to. The governor setting is arranged to be controlled either manually by speed lever 142 or automatically by pilot motor 143 having a field winding 143'. The pilot motor is arranged to drive gear 144 which is normally arranged to move a bell-crank lever, one arm 145 of which is connected to the rod 146 which controls the governor setting. The other arm 147 of this bell-crank lever is provided with a pivoted member 148 which connects the gear 144 to the bell-crank lever. Limit switches 149 and 150 are provided in the circuit of motor 143 and these limit switches are arranged to be controlled by a member 151 adjustably secured to the rod 146. Limit switch 150 is arranged to be operated when the pilot motor has moved the governor to its minimum speed setting. Limit switch 149 is arranged to be opened whenever the pilot motor has set the governor for any predetermined speed limit, and I have arranged the lever 142 to permit of adjusting this limit. To accomplish this result, I have arranged the lever 142 as a bell-crank, the arm 152 of which is arranged to operate the rod 153 which carries the member 154, upon which the limit switch 149 is mounted. The rod 153 is represented as moving through guiding members 155. Lever 142 is provided with a notched projection 156 which is adapted to depress and engage one end of the pivoted member 148 to release the bell-crank lever 145, 147 from the gear 144 and connect it to the arm 142. This arrangement makes it possible to disconnect the pilot motor control at any time manual operation by lever 142 is desired. Whenever it is desired to restore pilot motor operation, it is merely necessary to disengage member 148 from the notch in member 156 and move lever 142 to any desired speed limiting position. An exciter 157 is adapted to be connected by contactor 158 to supply excitation current to the slip rings 19 and 20 connected to the generator field winding. The exciter 157 is provided with slip rings 158'' connected to a reactance 159, the midpoint of which is grounded to provide a three-wire system for the control circuits of the system. A resistance 160 is provided in the generator field circuit and the amount of this resistance is arranged to be adjusted by a pilot motor 161 having a field winding 161'. An arm 162 moving with sliding contact 163 operates limit switches 164 and 165 to interrupt the circuit of pilot motor 161 when the limit of its travel in either direction is reached. At the end of its travel corresponding to minimum resistance and, therefore, maximum field strength, arm 162 is arranged to operate a contact 166 which controls the circuit of governor pilot motor 143 as hereinafter set forth. A contact 167 is interlocked with contact 165 and arranged to control the circuit of field winding 161' for a purpose hereinafter set forth. Current transformers 168 are provided in the secondary circuit of motor 137 and these transformers are connected to the stator winding 169 of a small synchronous motor 170 the rotating field member of which is shown at 171. The electric controller is provided with segments 172, 173, 174 and 175 cooperating with controller fingers $m'$, $n'$, $o'$, $p'$ to control the direction of phase rotation between transformers 168 and stator winding 169. Motor 170 is arranged to drive one gear 176 of the differential mechanism D. The gear 177 of differential D is arranged to be driven at substantially constant speed by pilot motor 178 having a field winding 178'. The planet carrier 179 of differential D is arranged to operate a rod 180 carrying contacts 181 and 182. Contact 181 is arranged to control the circuit of pilot motor 161 as hereinafter described. The construction of differential D is more clearly shown in Fig. 7$^a$ from which it may be seen that the planet carrier is connected to a toothed ring 183 which cooperates with a spring member 184 mounted on arm 185 which moves rod 180. A stationary pin 186 is arranged to cooperate with the spring member 184 to disengage said spring member from toothed ring 183 upon a predetermined movement of rod 180 in either direction. It is apparent from this construction that the rod 180 will be moved in one direction or the other in accordance with the direction of motion of the planet carrier, and that, while the motion given to the rod 180 is limited, the planet carrier is free to revolve continuously in either direction. It is obvious, however, that my invention is not limited to any particular construction for enabling the differential D to operate the contacts 181 and 182. Motor 170 is also arranged to drive one gear 187 of a second differential E, the other gear 188 of which is also driven by pilot motor 178. The second differential E is, however, geared to motors 170 and 178 so that the planet carrier 189 will be stationary for a different ratio of speeds than that which renders the planet carrier 179 of differential D stationary. In the arrangement illustrated differential E is stationary for a higher ratio of speeds than differential D, speed reducing gears 190 and 191 being connected between gear 176 and gear 187, while gears 192 and 193 are arranged so that gears 177 and 188 operate at the same speed. Differential E is arranged to operate a rod 194 carrying contacts 195, 196, and 197 for purposes hereinafter set forth. It is apparent that the speed of rotation of motor 170 is a measure of the slip of motor 137 and it is, therefore, clear that the differential mechanisms D and E operate their contacts at certain predetermined values of slip in cycles per second. The speed of motor 178 determines the values of slip at which differentials D and E operate.

Assuming that the turbine has been set into operation, the operation of the arrangement shown in Fig. 7 in starting ahead from rest is as follows. In its first position, the controller segments 174 and 175 engage fingers $m'$, $n'$, $o'$, $p'$, to connect winding 169 of motor 170 for a certain direction of rotation. Controller segment 198 simultaneously energizes fingers $a$ and $c$ to close line contactors 7, 8 and 10 for ahead operation. Controller segment 198 also energizes controller finger $w$ positively to excite field windings 143′, 161′ and 178′ of the three pilot motors and to excite the field winding 171 of motor 170. Controller segment 199 also bridges fingers $x$ and $y$ to energize $x$ negatively. The next step of the controller energizes finger $z$ to close contactor 158 to connect the generator field winding to the exciter 157. Generator 3 now supplies current to operate the propeller driving motor 137 in the ahead direction, and resistors 139 being in circuit, a strong starting torque is developed as is well known in the art. The slip being high, motor 170 operates at a high rate of speed and maintains differentials D and E in the position corresponding to high slip. In the final position of the controller, finger $aa$ is energized positively to operate the motor 178 clockwise. Contact 181 of differential D being closed in its lower position, a circuit is completed from negative controller, finger $x$ through contact 181 and limit switch 164 to operate the pilot motor 161 in a direction to cut out resistance 160 and increase the strength of the generator field winding. As soon as maximum field has been put upon the generator, member 162 opens contact 164 to stop the pilot motor 161 and moves contact 166 to its upper position to complete a circuit from positive controller finger $w$ through limit switch 150 to pilot motor 143, to operate said pilot motor in a direction to reduce the turbine speed to a minimum. When minimum speed has been reached limit switch 150 will be opened by member 151 and pilot motor 143 will be stopped. When motor 137 has accelerated to a point where the slip is such that the motor torque with the resistors in circuit is the same as the torque with these resistors eliminated, differential E closes contact 195 to complete a circuit from controller finger $aa$ through contact 195 to close contactors 140 and short-circuit resistors 139. Simultaneously, with the closing of contact 195 contacts 196 and 197 are closed, but the closing of the latter contacts has no effect for the reason that controller fingers $bb$ and $cc$ are at this time unenergized. A further increase in speed carries motor 137 over its point of maximum torque to the zone of stable operation. At this point differential D is arranged to reverse and move contact 181 to its upper position completing a circuit from positive controller finger $w$ through limit switch 165 to operate pilot motor 161 in a direction to insert resistance in the field circuit of the generator and thus reduce the generator field strength. However, the first motion in this direction permits contact 166 to move to its lower position to close a circuit from negative controller finger $x$ through contact 166 and limit switch 149 to operate pilot motor 143 in a direction to increase the turbine speed. The increase in turbine speed causes an increase in slip which returns differential D to the neutral position, thus preventing further motion of pilot motor 161. Pilot motor 143, however, continues to operate until the turbine has come up to the speed determined by the position of the lever 142, at which time limit switch 149 is opened and pilot motor 143 stopped. The acceleration of the turbine having ceased, the slip again falls below the predetermined value and differential D again moves contact 181 to its upper position to recomplete the positive circuit through limit switch 165 to operate pilot motor 161 to further reduce the generator field excitation, and this reduction in excitation is carried to the point where equilibrium is reached with just the safe margin of torque on the main driving motor. In order to maintain this excitation without unnecessary hunting of pilot motor 161, contact 182 is provided. This contact is arranged to short-circuit a small resistance 200 in series with the field winding 178′ of pilot motor 178 when contact 181 is in its midposition. The short circuiting of this resistance slightly changes the speed of pilot motor 178 so that when the state of equilibrium is reached, it is necessary to vary the slip of the main motor 137 more than the speed change produced by resistance 200 before contact 181 can close in either its upper or lower position. Resistance 200 will be so adjusted as to permit a reasonable variation in the slip without a change in excitation. As thus arranged, motor 178 will hunt or vary in speed slightly due to the opening and closing of contact 182, but hunting of motor 161 will be prevented. Any variations in the navigating conditions of the ship, whether due to wind, wave, motions of the rudder or other causes, which tend to produce a variation in the slip of the propeller driving motor will at once cause differential D to operate to vary the excitation to that value necessary for efficient and stable operation. If, for example, storm conditions are encountered, which require greater motor torque, pilot motor 161 will operate to cut out resistance 160 until, if necessary, the generator field excitation has reached its maximum value. If the slip is still greater than the predetermined number of cycles per second, arm 162 of pilot motor 161 will move contact 166 to its upper position, thus setting pilot motor 143 into operation to lower the speed of the turbine to prevent motor 137 from falling out of step.

To start the ship from standstill, it is therefore merely necessary to throw the controller into the full-ahead-position, whereupon the differential mechanism will control the motor secondary circuit, the generator field circuit and the turbine speed to insure the proper acceleration of the motor, and also the proper normal operation of the ship after it has been brought up to any desired speed as determined by the setting of the speed lever 142. With any given speed setting of lever 142, the apparatus will maintain the excitation at the lowest permissible value for stable operation at that speed.

To change from full speed ahead to full speed astern with the arrangement shown in Fig. 7, it is merely necessary to throw the controller from the ahead position to the astern position. It will be observed that contact finger $z$ is arranged to open contactor 158 to deenergize the generator field winding before the line contactors 7 to 11 are manipulated. The first step of the controller in the astern position causes segments 172 and 173 to reverse the connections for motor 170. Segment 201 energizes contact fingers $c$ and $d$ to close line contactors 7, 9 and 11 for astern operation and energizes contact finger $w$ positively to excite field windings 143′, 161′, 178′ and 171. Controller segment 202 energizes finger $x$ negatively. The next step of the controller closes contactor 158 to excite the generator so that current is supplied to the propeller driving motor 137 for astern operation. Inasmuch as the slip is high, motor 170 sets differentials D and E to their high slip positions. Contact finger $aa$ is energized in the final position of the controller and the remaining operations take place exactly as in starting from rest, that is, resistors 139 are in circuit, resistance 160 is cut out and the turbine speed is reduced to a minimum. Resistors 139 are then short-circuited, the turbine speed increased and the alternator excitation decreased to the proper value for efficient and stable operation in the astern direction.

When the controller is thrown to the off-position from either direction of operation, segment 203 energizes controller finger $bb$ negatively and segment 204 energizes controller fingers $cc$, $dd$ and $ee$ positively. Finger $ee$ supplies current through contact 167 to pilot motor field winding 161′. Finger $dd$ completes a positive circuit through limit switch 165 to operate motor 161 in a direction to insert resistance 160 into the generator field circuit. When the resistance has been increased to its maximum value, member 162 opens contacts 165 and 167 to deenergize the armature and field circuits of the pilot motor 161. The circuit of field winding 178′ of motor 178 is completed at this time from controller finger $ee$ through contact 167 and also from controller finger $cc$ through contact 197. The armature circuit of this motor 178 is completed from finger $bb$ through contact 196 to operate motor 178 to set differentials D and E in the position corresponding to high slip. It will be noted that, whereas the armature of motor 178 is ordinarily supplied from positive controller finger $aa$, it is at this time supplied from negative controller finger $bb$ which causes motor 178 to reverse to set differentials D and E in their high slip positions. It will be noted that contact 197 connected to contact finger $cc$ at this time parallels contact 167. If this contact 197 were not provided and the system had been running with member 162 near the limit of its travel, contact 167 might be interrupted, to open the circuit of field winding 178′, before motor 178 had had time to restore differentials D and E to their high slip positions. Differential D will, of course, reach its high slip position before differential E. When differential E reaches its high slip position, contacts 196 and 197 open to deenergize the armature and field circuits of motor 178, and contact 194 opens to cause contactors 140 to reinsert resistors 139. The turbine is permitted to continue at its last speed. It may, however, be reduced to the maneuvering speed by lever 142 if desired. The apparatus is, therefore, set in the proper condition for movement of the controller to operate either ahead or astern.

It will be apparent that my invention is not, in its broad aspects, limited to any particular means for increasing the motor torque with respect to the propeller torque when the slip varies from the predetermined value. It is obvious, for example, that the mechanism may be arranged to control the torque of an induction motor by varying the resistance in the secondary circuit step by step or gradually throughout a considerable range. It is further apparent that my invention is not limited to ship propulsion, but, on the contrary, is capable of a more general application.

The arrangement of Fig. 7, which has just been described, indicates one method of substituting an electrical equivalent for a differential mechanism combining generator speed and motor speed. It is apparent that motor 170 revolves at a speed corresponding to the frequency of slip and that the resultant effect produced by the combination of speeds of motors 170 and 178 is independent of variations in generator frequency.

Fig. 8 shows a different arrangement of differential apparatus which might be used in the system shown in Fig. 7. In Fig. 8, shaft 205 is adapted to be driven in one direction by the main driving motor, while shaft 206 is adapted to be driven in the opposite direction by a small synchronous motor. Slip speed is transmitted by ring gear 207, on which the floating pinions 208 are mounted, to the gear 209 to which bevel-gear 210 of a second differential is attached. Shaft 211 is adapted to be driven at the desired constant speed so that the ring 212, which carries the floating pinions 213, will reverse when the driving motor passes above or below the critical established slip speed.

Fig. 9 is a modification of the apparatus shown in Fig. 8 adapted to perform one set of functions at one value of slip and another set of functions at another value of slip, as in the system shown in Fig. 7. In Fig. 9, gear 209, carrying gear 210, carries a second gear 214 of a third differential, the ring 215 of which carries floating pinions 216. Constant speed shaft 211 is arranged to drive shaft 217 at a higher speed than it drives shaft 218. As thus arranged, it is apparent that ring 212 will be stationary at a higher value of slip than that for which ring 215 is stationary.

While I have set forth in detail how my invention may be used automatically to perform all of the operations necessary in a system wherein the propeller motor is arranged to operate as a synchronous generator for braking purposes, as an induction motor for acceleration and reversal and as a synchronous motor for normal operation, as well as in the more simple plain induction motor system, it is obvious that my invention is not limited to either system. It is apparent that, if desired, the step of synchronous braking may be omitted with its function in systems including propeller driving motors of the synchronous type, in which case the control apparatus and control circuits will be simplified in an obvious manner.

The arrangement shown in Fig. 7 comprises a single turbo-alternator connected to operate a single propeller driving motor, but I have developed a similar system for battle cruiser propulsion in which there are four turbo-alternators and four propellers, each propeller arranged to be driven by two motors mounted on the same shaft, and each of the motors arranged to be operated at two speeds, the change in speed being accomplished by pole changing switches. The system also includes means for changing the internal connections of the motors, so that a high effective secondary resistance is available for starting and reversing, and a low resistance for normal operation. I have also arranged the system so that the motors may be operated collectively from any one of the alternators, and so that each alternator may be connected to operate an individual motor.

All of the problems presented by such an installation are present in an installation wherein but two turbo-alternators and two propellers, each provided with a single driving motor, are used. Fig. 10 represents such an installation. The turbine 1 drives the alternator 3 which is connected through a disconnecting switch 219, reversing switch 220 and pole changing switch 221 to the stator of motor 222, the rotor of which is arranged to drive propeller 6. Differentials D and E are arranged to operate contacts 181, 182, 195, 196 and 197 to control the connections of pilot motors 143, 161 and motor 178 just as in the arrangement shown in Fig. 7. The controller contact fingers alone have been shown for the reason that the arrangement of segments on the controller is the same as that shown in Fig. 7. Turbine 1' drives alternator 3' which is connected through disconnecting switch 219', reversing switch 220' and pole changing switch 221' to the stator 222', the rotor of which is arranged to drive propeller 6'. Differentials D' and E' are arranged to operate contacts 181', 182', 195', 196' and 197' to control the circuits of pilot motors 143'', 161'' and motor 178''. The limit switches 149 and 150 are shown somewhat more diagrammatically in Fig. 10 than in Fig. 7, but it is apparent from the illustration that the arrangement is functionally the same in each case. The connections to the controller contact fingers are identical with the connections to the contact fingers of the controller for the other generator and motor. Inasmuch as the layout for driving one propeller is almost identical with the layout for driving the other, the description of the arrangement of parts will be confined as far as possible to one side of the ship, the corresponding elements on the other side of the ship being designated by the same reference characters primed. The rotor cooperating with stator 222 is provided with a high resistance squirrel cage winding 223 and a low resistance definite winding having points 224, 225 and 226 connected to slip rings 227 and intermediate points connected to slip rings 228. A contactor 229 is arranged to short-circuit slip rings 227 and a contactor 230 is arranged to short-circuit slip rings 228. When the pole changing switch 221 is set for one primary pole number, blade 231 of switch 232 will open the circuit of contactor 230 and prepare the circuit of contactor 229 for control by contact 195 of differential E. When pole changer 221 is set for the other pole number, blade 233 of switch 232 will complete a circuit holding contactor 229 closed, while blade 231 will prepare the circuit of contactor 230 for control by contactor 195 of differential E. The low resistance rotor definite winding is thus made responsive to the respective primary pole numbers, as will be obvious to those skilled in the art. Since the propeller driving motors are not of the ordinary slip ring type, it is necessary to resort to an arrangement dfierent from that shown in Fig. 7 for producing slip frequency to operate differentials D and E. If a machine having an induction motor primary and a wound rotor secondary mounted upon the main motor shaft were used to produce slip frequency, it would be necessary to make such an auxiliary machine quite large if the slip frequency were transmitted from the motors to the control stations. Therefore to avoid transmitting slip frequency to any distance, I provide a small auxiliary synchronous machine 234 to produce a frequency proportional to motor speed and transmit this frequency to the control station where it is introduced into the slip rings 235 of a small induction motor 236, the stator 237 of which is supplied at the frequency of generator 3. The arrangement of windings shown for motor 236 indicates that auxiliary machine 234 is a three phase machine, while the generator 3 is a two phase machine, but obviously my invention is not limited in this respect. The motor 236 rotates at slip frequency due to the fact that it combines a frequency proportional to motor speed in the rotor and line frequency in the stator. It thus operates as an electrical differential. In view of the fact that the propeller driving motor is a two speed motor, it is necessary to provide a pole changing switch 238 in the circuit of generator 234, in order to make the motor 236 rotate at the frequency of slip for both pole numbers. It is also necessary simultaneously to change the speed of motor 178, and to accomplish this a switch 239 may be operated to control a shunt circuit around an adjustable resistance 240 in the field circuit of motor 178.

A reversing switch 241 is arranged in the circuit of generator 234 to be operated simultaneously with reversing switch 220 for the propeller driving motor. It is apparent that the reversing switch 220 may be controlled by controller fingers a, c, d, as in Fig. 7 and that reversing switch 241 may be controlled by fingers corresponding to fingers m', n', o', p' of Fig. 7 if desired.

A bus-tie switch 242 is arranged to tie the motors 222 and 222' together, and this switch will preferably be interlocked with disconnecting switches 219 and 219' so that the generators 3 and 3' cannot be thrown in parallel as set forth in the patent to Emmet No. 1,214,528, February 6, 1917. A switch 243 having contacts 244, 245 and 246 is arranged to be operated simultaneously with the bus-tie switch. Switch 243 is provided for the purpose of interconnecting differential control mechanisms D and D' when both motors are operated from one generator, and for segregating these control mechanisms when each generator is connected to operate its own motor. It is apparent that switch 243, in the position it occupies when the bus-tie switch 242 is open, should complete such circuits as to establish the identical connections between differential mechanism D and the devices controlled thereby as are completed in Fig. 7 heretofore described in detail. When the bus-tie switch is closed, switch 243 should so interconnect the contacts of differentials D and D' that the excitation of the alternator will be decreased only when the slip of both motors is below the predetermined value, and so that the excitation will be increased whenever the slip of either of the propeller driving motors increases above the predetermined value. The connections by which this is accomplished will be set forth hereinafter, but it may be here stated that this result is accomplished by arranging contacts 181, and 181' to operate in series for decreasing the generator field strength and to operate in parallel for increasing the generator field strength. Switches 247 and 274' are pilot motor disconnecting switches.

The operation of the arrangement shown in Fig. 10 when the bus-tie switch 242 is open and switch 243 consequently in its right hand position, as shown in the drawing, will now be set forth. Switches 247 and 247' will be closed to their operative positions and the controller corresponding to each row of contact fingers operated exactly as in Fig. 7. The starting torque of the motors will be developed in the high resistance squirrel cage windings 223 and 223'. At any predetermined desired slip differentials E and E' will close contacts 195 and 195' respectively to close contactors 229 and 229' to render the low resistance definite rotor windings effective just as the contactors 140 of Fig. 7 operate to short-circuit resistors 139. In its high slip position, as shown by the arrow, differential D moves contact 181 to complete a circuit from negative controller finger *x* through contact 164 to operate pilot motor 161 to cut resistance 160 out of circuit, and in its low slip position contact 181 completes a circuit from positive controller finger *w* through contact 245 and contact 165 to operate pilot motor 161 in a direction to insert resistance 160. In its high slip position differential D' moves contact 181' in the direction of the arrow to complete a circuit from negative controller finger *x'* through contact 164' to operate pilot motor 161'' in a direction to cut out resistance 160', and in its low slip position contact 181' completes a circuit from positive controller finger *w'* through contact 246, contact 181' and contact 165' to operate pilot motor 161'' in a direction to cut in resistance 160'. It is apparent, therefore, that contacts 245 and 246 cooperate with contacts 181 and 181' to establish the same operation as takes place in the arrangement shown in Fig. 7, that is to say, the operation of each differential mechanism is independent of that on the other side of the ship. The operation of the system is not materially complicated by the provision of pole changing switches for the propeller motors, since the pole changing switches 238, 238' and the speed controlling contacts 239, 239' are operated simultaneously with the propeller motor pole changing switches 221, 221' as heretofore set forth. If now it be desired to operate both motors from generator 3, switch 247' will be opened to render motors 143'' and 161'' inoperative. The bus-tie switch will be closed and switch 243 consequently placed in its left-hand position, both controllers will be operated in the desired direction and control motors 178, 178'', 236 and 236' will be set into operation as heretofore set forth. Differential mechanisms E and E' operate independently to close contacts 195 and 195' to operate contactors 229 and 229' to render the low resistance motor windings effective. While the slip in either motor is above the predetermined desired value, motor 161 will tend to operate in a direction to cut out resistance 160, and, if necessary, subsequently reduce the turbine speed as heretofore set forth. If, for example, differential D moves to its high slip position, it will complete a negative circuit from controller finger *x* through contact 181 and limit switch 164 to pilot motor 161. If differential D' is in its high slip position, it will complete a like negative circuit from controller finger *x'* through contact 181', contact 244 and limit switch 164 to pilot motor 161. If differential D only moves to its low slip position no circuit will be completed, but if differential D' also moves to its low slip position a circuit will be completed from controller finger *w* through contact 181, contact 245, contact 181', contact 246 and limit switch 165 to operate pilot motor 161 in the reverse direction to cut in resistance 160. It will be noted that at this time both differential mechanisms D and D' cooperate with controller finger *w*, the circuit of controller finger *w'* being open at switch 246.

It is apparent that one motor may be operated in one direction and one in the other direction for turning the ship if desired and this operation may take place as well when both motors are operating from one generator, as when the generators are connected individually to their corresponding motors. That this is true, is evident from the fact that motors 236 and 236' are reversed with the respective propeller driving motors so that the differential mechanisms operate in the same manner for either direction of rotation.

Fig. 11 represents an arrangement that may be used in place of the changeable pole combination for the auxiliary speed generator 234 of Fig. 10. In Fig. 11, two small synchronous generators 250 and 251 are used, together with a double throw switch 252 in the circuit leading through reversing switch 241 to motor 236. Generators 250 and 251 will be arranged to generate different frequencies and switch 252 will be manipulated with pole changing switch 221. A double throw switch 253 is arranged to be thrown simultaneously with switch 252 to energize the field circuit of either generator 250 or 251 depending on which generator is rendered effective by switch 252.

The modifications shown in Figs. 7 to 11 inclusive form the subject matter of my divisional application, Serial No. 499,507 filed September 9, 1921.

I have herein shown and particularly described certain embodiments of my invention and certain methods of operation for the purpose of explaining its principle and showing its application, but it will be obvious to those skilled in the art that many modifications and variations, other than those specifically referred to, are possible and I aim, therefore, in the appended claims, to cover all such modifications and variations as fall within the scope of my invention.

What I claim as new and desire to secure by Letters Patent of the United States, is:—

1. An electric ship propulsion system comprising an alternating current motor arranged to drive a propeller and adapted to operate with a plurality of torque characteristics, a generator arranged to supply current to operate said motor, a device adapted to operate at a constant speed and means dependent upon the interrelation of motor speed, synchronous speed and said constant speed for controlling the torque characteristic of the motor.

2. An electric ship propulsion system comprising a motor arranged to drive a propeller and constructed so as to be capable of operation as an induction motor, a generator arranged to be connected to supply current to operate said motor, a device adapted to operate at some definite predetermined speed, and means arranged to control the excitation of the generator connected and arranged to be dependent in its operation upon the interrelation of actual motor speed, synchronous speed and said predetermined speed.

3. In an electric power system, a work motor, an alternating current generator adapted to supply current to said work motor, means adapted to supply exciting current to said motor and generator, means adapted to run at constant speed, means responsive to the algebraic sum of the speeds of the work motor, and constant speed means, and circuit controlling means controlled by said algebraic summation means adapted to control the excitation of said generator and work motor.

4. In an electric power system an alternating current generator, a work motor adapted to operate with either induction or synchronous characteristics, means whereby exciting current may be supplied to said motor to impart the synchronous characteristic, means connected so as to vary in effect with variations in the slip of said work motor, means cooperating with said last means producing a predetermined effect, and means responsive to the relative values of said effects arranged to control the operating characteristic of said work motor.

5. An electric ship propulsion system comprising a synchronous generator, a motor adapted to be operated from said generator as an induction motor for starting and reversing said propeller, a device adapted to operate at a predetermined speed, means dependent upon the interrelation of motor speed, synchronous speed and said constant speed for establishing connections for operating said motor as a synchronous motor supplied by said generator when the slip during induction motor action has fallen to a value represented by said predetermined speed.

6. In an electric power system an alternating current generator, a work motor adapted to operate with either synchronous or induction motor characteristics, a constant speed motor, control means arranged to reverse the phase relations between generator and work motor, mechanism responsive to the algebraic sum of the speeds of the work and constant speed motors arranged to control the excitation circuits of the generator and work motor to cause operation of the work motor as a synchronous generator to slow down the motor when the control means is operated to reverse position, and to change the excitation connections to establish induction motor operation to reverse the work motor when the work motor has reached a predetermined speed.

7. An electric ship propulsion system comprising a synchronous generator and a motor adapted to operate with either induction or synchronous motor characteristics and means whereby connections may be established for operating the motor as a synchronous generator for braking purposes, as an induction motor for starting and reversing and as a synchronous motor for normal operation, characterized by the fact that means are provided for controlling said connections comprising differential mechanism arranged to combine motor speed, synchronous speed and a predetermined speed.

8. An electric ship propulsion system comprising a synchronous motor arranged to drive a propeller and adapted to operate with either synchronous or induction motor characteristics, circuit controlling means adapted to reverse the phase rotation between generator and motor and to control the generator and motor excitation connections, a winding for generating a frequency proportional to the propeller motor speed, an auxiliary motor connected to run in synchronism with the frequency developed in said winding, a constant speed motor, differential mechanism driven by said auxiliary and constant speed motors comprising contacts arranged to cooperate with said circuit controlling means to establish connections for operating said propeller driving motor as a synchronous generator and as an induction motor, a second synchronous motor connected to the generator side of the phase reversing means, a second differential circuit controlling mechanism, one element of which is arranged to be driven in one direction only by said second synchronous motor and the other element of which is arranged to be driven from said first differential mechanism, said second circuit controlling mechanism comprising contacts arranged to cooperate with said circuit controlling means to establish connections for synchronous motor operation and means arranged to reverse the phase rotation between said winding and said auxiliary synchronous motor simultaneously with the operation of said circuit controlling means to reverse the phase rotation between the synchronous generator and propeller driving motor.

9. An electric ship propulsion system comprising a synchronous generator, a motor adapted to be supplied by said generator arranged to drive a propeller, a winding adapted to be excited for operating said motor as a synchronous machine and a switching mechanism for controlling the exciting circuits of both motor and generator comprising contacts arranged to delay the manipulation of one of said circuits a predetermined interval after the completion of the other.

10. An electric ship propulsion system comprising a motor arranged to drive a propeller, an electric generator arranged to be connected to supply current to operate said motor, means for controlling the circuits of said motor and generator adapted in a certain position to establish connections for operating said motor as a generator for braking purposes and means arranged to be dependent in its operation upon the direction of rotation of the propeller shaft for controlling the connections established in the braking position of said controlling means.

11. An electric ship propulsion system comprising a motor arranged to drive a propeller, an electric generator arranged to be connected to supply current to operate said motor, controlling means adapted to be set for ahead or astern operation of the ship, mechanism controlled by said controlling means for controlling the circuits of said motor and generator adapted in one phase of its operation to establish connections for operating said motor as a generator for braking purposes, and means cooperating with said mechanism arranged to prevent the establishment of braking connections when the controller is set for a direction of operation corresponding to that in which the propeller is being operated by the drifting of the ship.

12. An electric ship propulsion system comprising an alternating current motor arranged to drive a propeller, a generator for supplying current to operate said motor, adjustable speed means for driving said generator and differentially operating mechanism arranged to produce a regulating effect varying with changes in motor load cooperating in the system to maintain the motor within a stable range of operation.

13. An electric ship propulsion system comprising a synchronous generator, a motor arranged to drive a propeller and adapted to be connected to operate in synchronism with said generator and means responsive to variations in the mechanical lag of said motor with respect to said generator arranged to regulate the generator excitation according to the torque requirements of the motor.

14. An electric ship propulsion system comprising a synchronous generator, a motor arranged to drive a propeller and adapted to be connected to operate with either induction or synchronous motor characteristics, a device adapted to operate at constant speed, means dependent upon the interrelation of motor speed, a synchronous speed and said constant speed, for controlling the torque characteristics of the motor and differential mechanism cooperating with said means to control the generator excitation during synchronous operation to maintain the mechanical lag of the motor with respect to the generator within the range of stable and efficient operation.

15. A power transmission system comprising a source of alternating currents, a synchronous motor and means for regulating the system in accordance with the mechanical lag of the motor.

In witness whereof, I have hereunto set my hand this 13th day of March, 1920.

DAVID C. PRINCE.